(12) United States Patent
Hoffman et al.

(10) Patent No.: US 11,302,041 B2
(45) Date of Patent: Apr. 12, 2022

(54) HIGH VISIBILITY OVERLAY SYSTEMS AND METHODS

(71) Applicant: FLIR Systems, Inc., Wilsonville, OR (US)

(72) Inventors: Dan Darrel Hoffman, Mesa, AZ (US); Robert Bush, Wilsonville, OR (US)

(73) Assignee: TELEDYNE FLIR, LLC, Thousand Oaks, CA (US)

( * ) Notice: Subject to any disclaimer, the term of this patent is extended or adjusted under 35 U.S.C. 154(b) by 0 days.

(21) Appl. No.: 16/802,489

(22) Filed: Feb. 26, 2020

(65) Prior Publication Data
US 2020/0193652 A1    Jun. 18, 2020

Related U.S. Application Data

(63) Continuation-in-part of application No. 15/863,770, filed on Jan. 5, 2018, now Pat. No. 11,087,512.

(60) Provisional application No. 62/810,904, filed on Feb. 26, 2019, provisional application No. 62/446,265, filed on Jan. 13, 2017.

(51) Int. Cl.
G06T 11/00   (2006.01)
F41G 1/34    (2006.01)

(52) U.S. Cl.
CPC .......... G06T 11/001 (2013.01); F41G 1/345 (2013.01)

(58) Field of Classification Search
CPC ......... H01L 2924/0002; H01L 2924/00; H01L 23/576; F41G 1/38; F41G 11/003; F41G 1/387; F41G 3/06; F41G 3/08; F41G 3/165
See application file for complete search history.

(56) References Cited

U.S. PATENT DOCUMENTS

| 8,857,714 | B2 | 10/2014 | Benson |
| 9,113,061 | B1 * | 8/2015 | Morley .............. H04N 5/23293 |
| 2008/0094639 | A1 | 4/2008 | Widmann |
| 2008/0163749 | A1 | 7/2008 | Reimer |
| 2008/0181507 | A1 | 7/2008 | Gape |
| 2012/0097741 | A1 | 4/2012 | Karcher |

(Continued)

OTHER PUBLICATIONS

NPL: The Visual Acuity Solution for Mac, User Guide Version 1.2, William H.A. Beaudot, year 2014 (Year: 2014).*

(Continued)

*Primary Examiner* — Ming Wu
(74) *Attorney, Agent, or Firm* — Haynes and Boone, LLP

(57) ABSTRACT

A highly visible overlay system includes contrasting visible elements configured to define an image overlay, a first portion of the visible elements comprises opaque elements having high contrast with bright areas of a field of view, and a second portion of the visible elements comprises illuminated elements having high contrast with darker elements of the field of view. The system may capture an image of a target scene for display and include a processing component configured to construct the plurality of contrasting visual elements in accordance with a visual acuity factor, and generate an electronic overlay constructed of the contrasting visual elements. The overlay may comprise a reticle formed on an optical element of a scope, including nonilluminated opaque portions and illuminated portions illuminated by a light source.

20 Claims, 19 Drawing Sheets

(56) References Cited

U.S. PATENT DOCUMENTS

| | | | |
|---|---|---|---|
| 2013/0173029 A1* | 7/2013 | Caldeira | G02C 13/001 |
| | | | 700/79 |
| 2015/0100880 A1 | 4/2015 | Matas et al. | |
| 2015/0323780 A1 | 11/2015 | Hamilton | |
| 2016/0169625 A1 | 6/2016 | Richards | |
| 2016/0265880 A1* | 9/2016 | Maryfield | G02B 23/18 |
| 2018/0039061 A1* | 2/2018 | Hairston | G02B 23/04 |

OTHER PUBLICATIONS

Claudio de Almeida, Our eyes, cameras and lenses—Part 2 Visual acuity and resolution, CCTV Institute 2014 (Year: 2014).

\* cited by examiner

HIGH VISIBILITY OVERLAY SYSTEMS AND METHODS

CROSS REFERENCE TO RELATED APPLICATIONS

This application is a continuation-in-part of U.S. patent application Ser. No. 15/863,770, filed Jan. 5, 2018, and entitled "HIGH VISIBILITY OVERLAY SYSTEMS AND METHODS," which claims the benefit of and priority to U.S. Provisional Patent Application No. 62/446,265 filed Jan. 13, 2017 and entitled "HIGH VISIBILITY OVERLAY SYSTEMS AND METHODS," which is incorporated herein by reference in its entirety. This application also claims the benefit of and priority to U.S. Provisional Patent Application No. 62/810,904 filed Feb. 26, 2019 and entitled "HIGH VISIBILITY OVERLAY SYSTEMS AND METHODS," which is incorporated herein by reference.

TECHNICAL FIELD

One or more embodiments of the present disclosure relate generally to to systems and methods for providing visible overlays in optical and/or image display systems.

BACKGROUND

Optical and imaging systems that present an image in combination with text and/or graphics are used in a variety of applications such as medical imaging (e.g., an X-ray overlaid with patient or diagnostic information), optical targeting (e.g., a reticle overlaid on a target image) and closed captioning on a television (e.g., text overlaid on a video). Typically, one or more images are displayed to an observer with text or graphics overlaid thereon. Depending on the size, color and other attributes of the overlay, the text or graphics may blend into the image, making the text or graphics indiscernible to an observer viewing the displayed image. In some approaches, the overlaid text or graphics may be made bigger and/or outlines or shadows may be added to further offset the overlaid elements for visibility, but such solutions may also further obstruct critical information in the displayed image.

It is therefore desirable to provide improved text and graphics overlays for optical and electronic displays that are highly visible to an observer without further obstructing the displayed image.

SUMMARY

Methods and systems disclosed herein include high visibility overlay techniques for use with an image display system and/or optical scope. In various embodiments, methods and systems are provided that allow for the creation of text and graphics overlays that are visibly discernible to an observer against any background. In many embodiments, the high visibility may be achieved without further obstructing the background or increasing the size of the overlay for visibility.

In one embodiment, visual elements are constructed using a visibly discernible structure that provides text and graphics overlays with sufficient contrast, both with the background and within the overlay itself. In various embodiments, the visual construct may be used for text and graphics overlays in medical imaging systems displaying a diagnostic image, remote surveillance systems displaying time and location data on a video screen, optical and electronic targeting systems displaying a reticle and ballistics data, imaging instruments, remote piloted systems, augmented reality applications, closed captioning on television, movie subtitles, and other image display applications utilizing text and/or graphics overlays.

In one embodiment, a high visibility system includes display components for displaying one or more images from an image source. Image overlay data is provided and converted to a high visibility overlay comprising a plurality of high visibility elements, which is combined with the image for display on the display components. High visibility configuration components utilize display configuration data and observer field of view information to construct the high visibility elements.

In one embodiment, the ratio of the horizontal resolution of the display as measured in pixels in the observer's horizontal field of view to the observer's horizontal field of view as measured in arc-minutes is calculated. The ratio of the vertical resolution of the display as measured in pixels in the observer's vertical field of view to the observer's vertical field of view as measured in arc-minutes is also calculated. In one embodiment, high visibility elements are constructed as blocks of pixels having a width equal to the horizontal ratio times a horizontal visual acuity factor (e.g., 1 arc-minute) rounded up to the nearest integer, and a height equal to the vertical ratio times a vertical visual acuity factor (e.g., 1 arc-minute) rounded up to the nearest integer. In various embodiments, the size of the high visibility elements may be configured according to an observer's visual acuity (e.g., using a 5 arc-minute visual acuity factor), and the height and width may differ based on observed differences in an observer's visual horizontal and vertical acuities.

In one embodiment, at least two high visibility elements are defined having contrasting colors, such as a black high visibility element and a white high visibility element. In various embodiments, the high visibility elements may have other shapes, such as rectangular, circular, or square with rounded corners, provided the size of the visibility elements is discernibly within the range of the observer's visual acuity. In other embodiments, the visual acuity factors may be set or adjusted by an observer based on the observer's own visual acuity. In some embodiments, at least two high visibility elements are defined having luminance contrast, including an opaque (nonilluminated) element and an element illuminated through a light source.

In one embodiment, the high visibility overlay is constructed using the image overlay data filled in using alternating high visibility elements. Other patterns may also be used in accordance with the present disclosure.

In one embodiment, an electronic reticle for firearm scopes is provided. The electronic reticle may be constructed of contrasting visual elements which are defined based on the scope configuration and specifications and the observer's field of view and visual acuity to provide enhanced visibility and function of the reticle for the observer.

In one embodiment, the scope may be an imaging scope such as a thermal imaging scope. In a thermal imaging scope, thermal images of a scene may be captured and displayed to the user. An electronic reticle constructed using the high visibility elements may be overlaid or otherwise combined with the thermal image.

According to another embodiment, a system is provided that includes a scope configured to mount to a firearm, the scope including optical elements arranged to magnify a target scene. At least one optical element includes an overlay formed thereon, the overlay comprising opaque elements and illuminated elements, wherein a light source is configured to illuminate the illuminated elements during operation for the user. In some embodiments, the overlay is constructed of high visibility elements having a plurality of visual acuity factors, each visual acuity factor corresponding to a magnification value.

In some embodiments, a system comprises an imaging component configured to capture an image of a target scene; a processing component configured to generate an electronic reticle based on at least the scope parameters and observer's field of view and visual acuity; and a display component configured to display the highly visible electronic reticle.

The invention disclosed herein is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
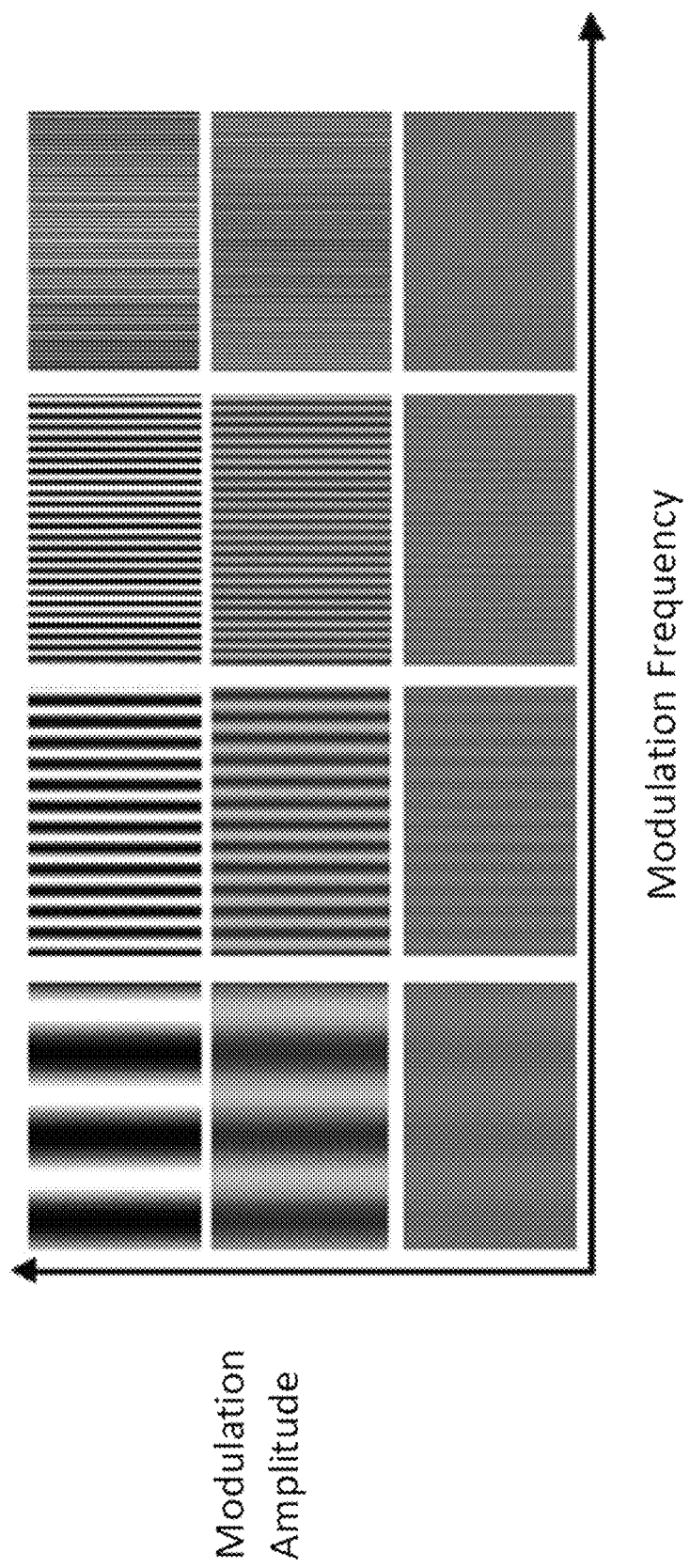
FIG. 1 is an exemplary chart illustrating factors influencing human perception of an edge.

Embodiments of the invention and their advantages are best understood by referring to the detailed description that follows. It should be appreciated that like reference numerals are used to identify like elements illustrated in one or more of the figures. It should also be appreciated that the drawings are not necessarily to scale, emphasis instead being placed upon clearly illustrating the principles of the present disclosure.

DETAILED DESCRIPTION

Methods and systems are provided for generating a highly visible overlay in an image display device. In various embodiments, methods and systems are provided that allow for creation of static text and graphic overlays that are visibly discernible to an observer against any image background. The methods and systems disclosed herein include embodiments providing highly visible overlays without increasing the size of the overlay, or otherwise further obstructing the background image for visibility.

In one embodiment, contrasting high visibility elements are defined and arranged to create a highly visible structure. The highly visible structure is comprised of contrasting high visibility elements providing sufficient contrast within a text or graphic overlay to allow the overlay to be visible against any background. In the embodiments disclosed herein, overlays constructed using the highly visible elements are visible by both the contrast with the background image and the contrast between highly visible elements within the overlay itself.

In various embodiments, the contrasting high visibility elements are defined to have characteristics approximating an observer's visual acuity threshold such that contrasting elements are both visible to an observer and small in size. As the contrasting elements become smaller, the contrasting elements appear smoother, up to a point where the contrast is no longer discernible and the contrasting elements appear to blur together. This limitation on contrasting element's smallest size is a function of many factors including the observer's location relative to the display elements, the surrounding environment such as the brightness of the viewing area, and the individual's visual acuity. In various embodiments, a high visibility construct is defined to provide the observer with a smooth image where the observer's eye is able to resolve the individual contrasting elements. With contrasting elements below this visual acuity threshold, the contrasting elements will blur together creating a single element that can blend in with the background.

FIG. 1 illustrates factors affecting human perception of an edge between contrasting elements. An observer's ability to perceive an edge in an image may be based on the amplitude modulation of the luminous difference between the two sides of an edge, and the frequency modulation of how often the edges appear. As illustrated, the vertical lines are easier to discern in images as the amplitude modulation increases (high contrast) and the modulation frequency decreases (width of the vertical lines increases). The vertical lines start to blur together as the amplitude modulation decreases (lower contrast between lines) and the modulation frequency increases (more, thinner lines per image). Eventually, as illustrated by the image on the bottom right, the differences between the contrasting lines will be too small for an observer to discern due to limitations in the observer's visual acuity and the lines will appear to blur together as a single element.

It is observed that the same effect occurs on an image display as the differences between contrasting elements (contrast and size) become smaller. The observer's ability to perceive an edge between contrasting elements is also a function of the observer's position relative to the display, the observer's field of view, environmental conditions such as lighting which affect the observer's pupil size, and the observer's own visual acuity which may change due to factors such as age.

In conventional systems, limitations on visual acuity are addressed by altering the text and graphics overlays, and altering and/or obstructing the background image. However, making the text and graphics brighter, darker or bigger quickly reaches its limits, and obstructing the background image is undesirable for many applications where details of the displayed background are important, such as with reticles for sighting.

Conventional systems use a variety of approaches to create an overlay that is visibly discernible. In some approaches, the overlaid text or graphics may be made bigger and/or outlines or shadows may be added to further offset the overlaid elements. Using these approaches, the overlaid elements can still get lost in high noise areas of the image or image sections with colors that are close to the displayed text. Increasing the size of overlaid elements, adding shadows and adding outlines also has the drawback of obstructing more of the displayed image.

To further differentiate overlaid text and graphics from the background image, a contrasting box may be added behind the text allowing the user to see the overlaid elements against the background box. An alternative to this approach is to overlay the entire image with a semi-transparent background image to allow the text to pop out. Another option includes altering the background image to make the text or graphics more discernible at the location of the overlay. For example, one such option involves blurring all or a portion of the background image to allow the text or graphics to be more easily viewed. Another approach is to introduce a gradient shift that creates contrast between a portion of the background image (for example, darken the bottom of the image) allowing the text or graphics to be more easily read.

Although these solutions allow the user to better discern overlaid text or graphics, each comes at the cost of further obstructing additional portions of the background image, which is undesirable for many applications. For example, a scope commonly used on high powered rifles for shooting targets at long distances provides magnification that allows a user to more easily see the target and aim the rifle. A scope commonly includes a reticle (e.g., intersecting lines of a crosshair) aligned with the barrel of the rifle that indicates to a user looking through the scope where the rifle is pointed. The reticle may be implemented as a mechanical structure in the line of sight of the scope such as a crosshairs on transparent glass or plastic member of the scope. In some systems, an electronic reticle is provided that mimics the mechanical reticle. However, with both conventional mechanical and electronic reticles, the reticle may be difficult to see against certain target backgrounds viewed through the scope. Further, the reticle may also provide certain information such as target distance or cross hairs to the user, which may be difficult to see against certain target backgrounds. With the limited field of view of a scope and precision required for aiming a rifle at a distance, it is desirable to keep the reticle small while presenting the observer with a clear and unobstructed view of the target.

Figure 2A:
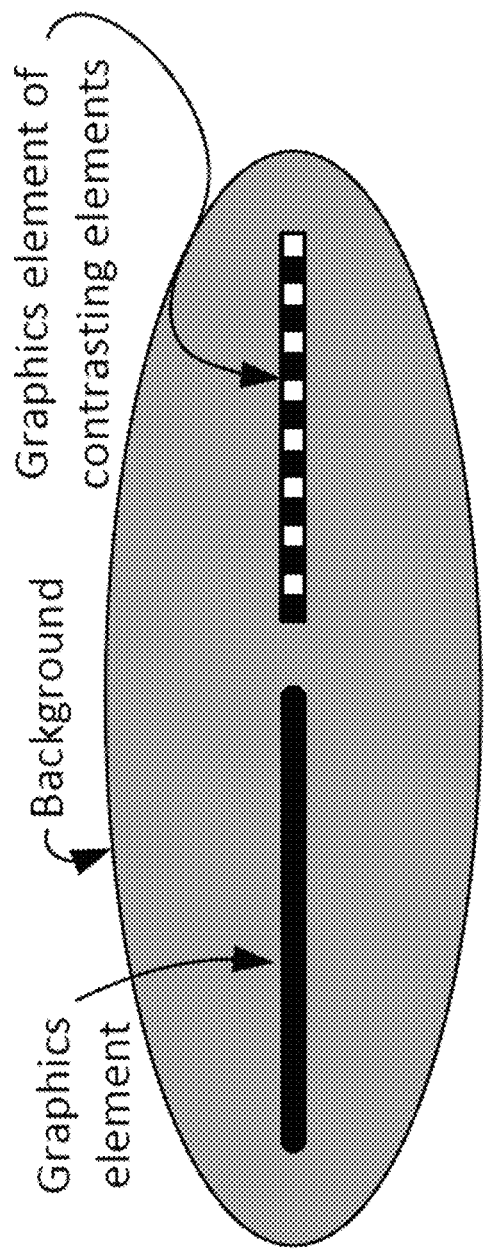
FIGS. 2A and 2B illustrate an exemplary visual construct for a highly visible overlay, in accordance with an embodiment.
Figure 2B:
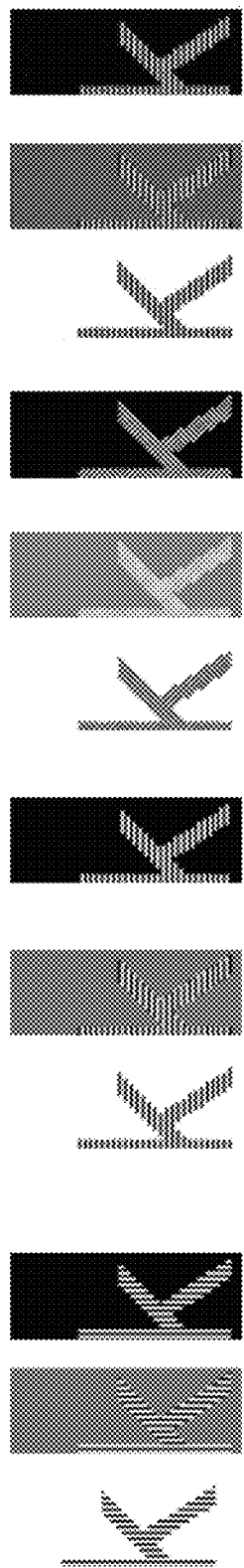

The embodiments disclosed herein provide highly visible overlays without obstructing the background image. As illustrated in FIGS. 2A and 2B, a graphics element is constructed that includes high contrast transitions between smaller highly visible elements. As illustrated, a line may be constructed that includes bright and dark transitions having a minimum spacing to allow for perception by an observer. In other words, the minimum size of the transitions or elements is set such that the eye can resolve individual light and dark transition in the line. Below this size, the bright and dark sections can appear to merge in the observer's vision to create a line of intermediate brightness (e.g., black and white contrasting elements can appear gray if the transitions are too small). When this merged line passes through an area with too little perceived difference from the line (such as a gray background), it will be lost in the background. To maintain visibility a line constructed in accordance the current embodiment maintains perceivable contrast across the elements that construct the line itself. FIG. 2B illustrates exemplary patterns of highly visible, contrasting elements that may be used to construct text and graphics images in accordance with embodiments of the present invention.

Figure 3A:
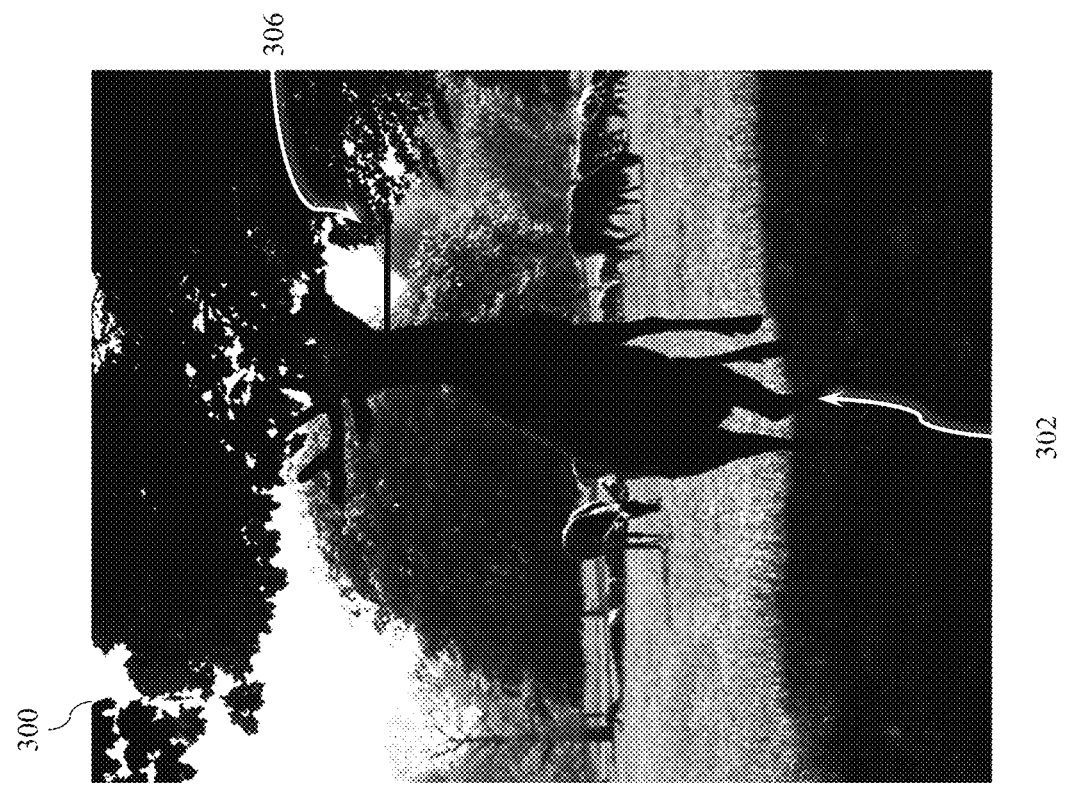
FIGS. 3A, 3B, 3C, 3D and 3E illustrate exemplary embodiments of graphics overlays in a targeting system having varying degrees of visibility.
Figure 3B:

As further illustration of the difficulty of overlaying graphics in images, an image of a deer is provided in FIGS. 3A-3E. In each image 300, a line, such as a line of a reticle, is overlaid on the image. A deer 302 is shown in the foreground of each image and a horizontal line overlaid on the image is shown on the display. Referring to FIG. 3A, a white horizontal line 304 is overlaid on the image. As shown, the white horizontal line 304 is visible on the deer 302, which is in the shade of a tree, but the line is not visible, and seems to disappear, in the bright open sky in the background. The line 304 then reappears in the trees. As shown in FIG. 3B, a black horizontal line 306 has similar limitations. The black horizontal line 306 is visible against the bright open sky, but appears to disappear when passing over the deer 302. In operation, the line may be used as a sight line for targeting the deer 302, and it is not desirable for the line to disappear against the target or background during targeting.

Figure 3D:
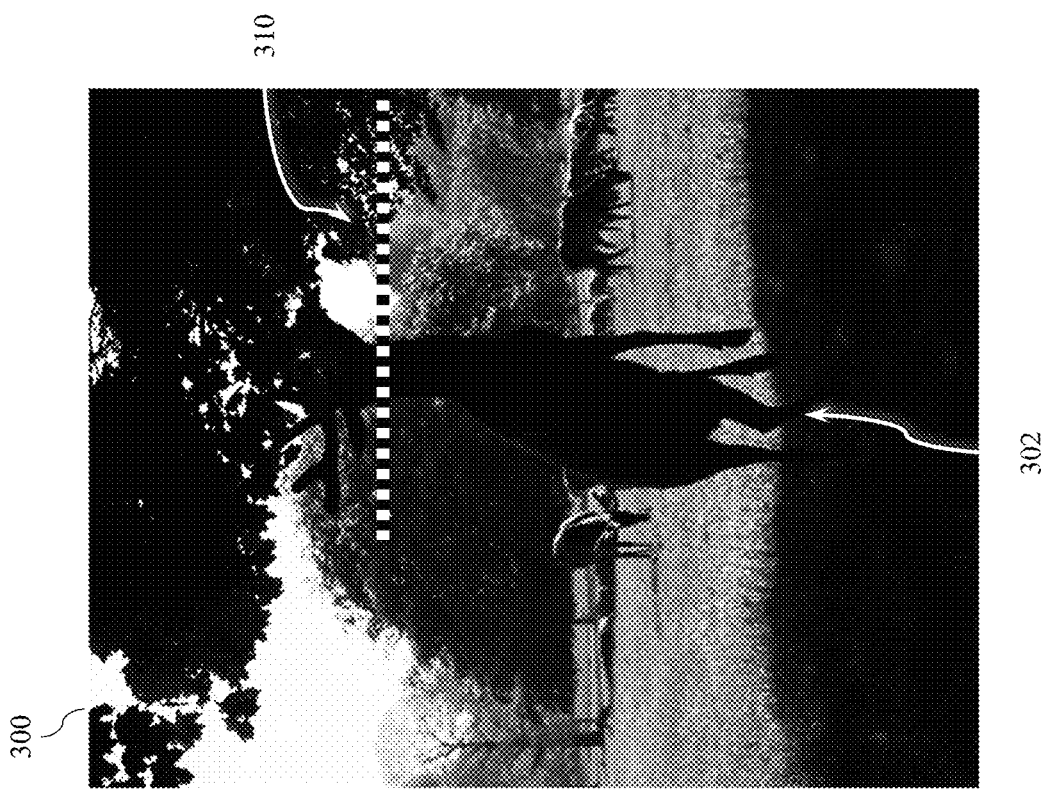
Figure 3C:
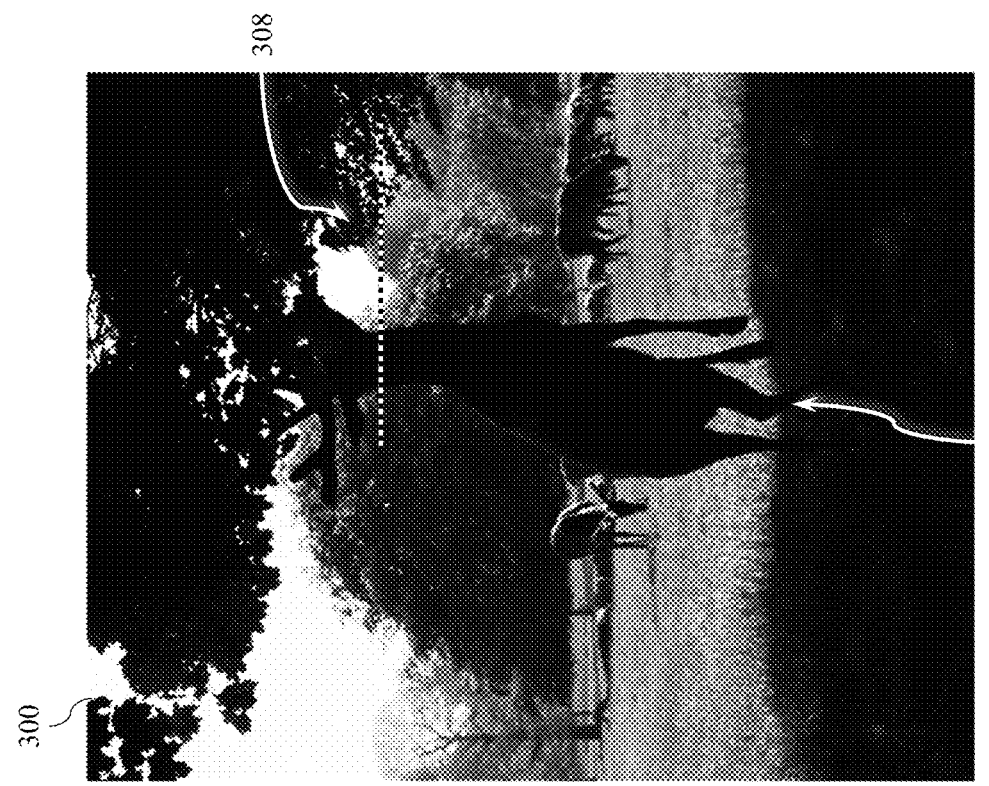
Figure 3E:
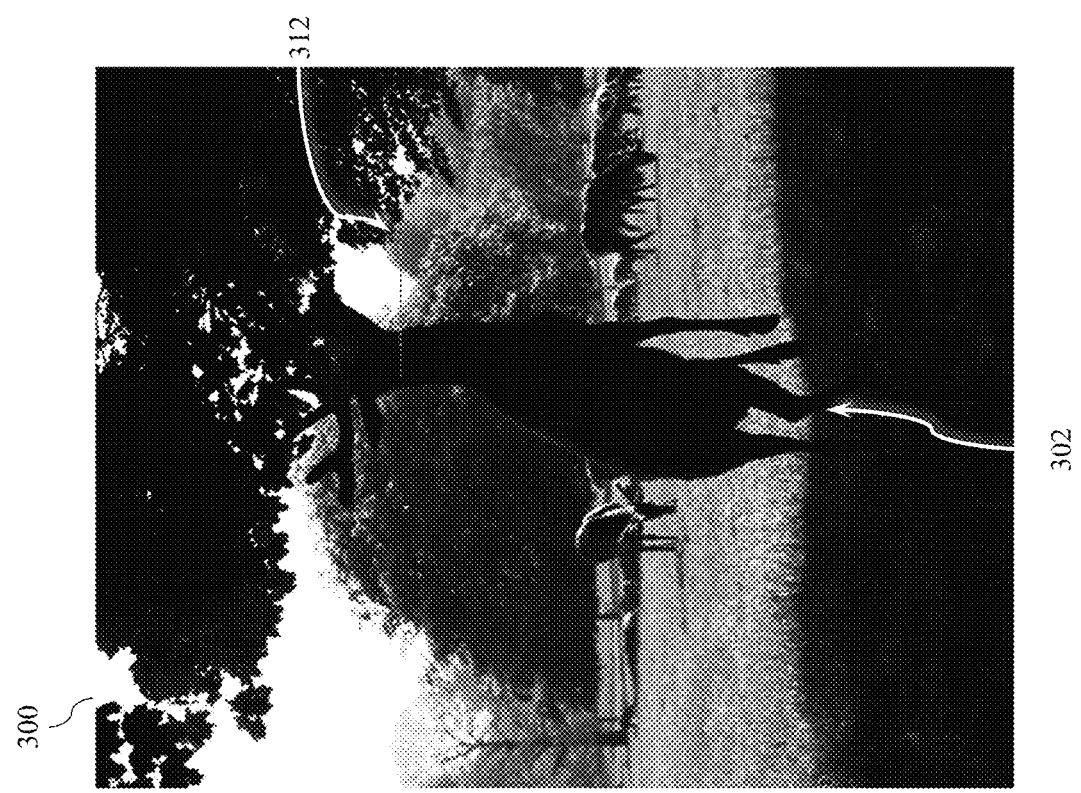

FIG. 3C illustrates a line 308 constructed of alternating black and white elements which is visible across all of the background image including the bright open sky and the deer in the shade. FIG. 3D illustrates a line of large alternating black and white elements 310, which obstructs more of the observer's view than necessary. FIG. 3E illustrates a line of alternating contrasting segments which are too small and not resolvable by the human eye, causing the line to appear gray and blend into the background image. The line can be seen in both the lightest and darkest areas, but the line may get lost in the portions of the background image of pictures with similar midlevel shades, such as trees in the background of image 300.

The systems and methods disclosed herein of generating a highly visible overlay from contrasting highly visible elements may be used in any display system, and are particularly well suited for applications where the characteristics of the background image are unknown or may change over time. The systems and methods may be used in electronic display systems, optical systems and other systems where text and graphics are overlaid on an image. As one example, edge lit signs like reticles can be constructed using their normal processes that will generate highly visible graphics from contrasting elements. In edge lit devices the light travels internally through a glass or plastic substrate. The light reflects completely off the front and back surfaces. When flatness of the glass surface is disturbed by some method light escapes from the surface of the glass at the disturbance. The disturbed section is the brighter part of the contrasting element. The darker part of the contrasting element is formed using dark materials added to the substrate surface. This combination creates areas that emit light with alternating with areas that block light forming a contrast element. The contrast elements can be used to form graphic elements such as text and graphics. As another example, printed material could include graphics constructed using highly visible elements as an overlay, with the contrasting elements created using darker colored ink either alternating with unprinted areas or using lighter colored inks or toner.

Methods and systems are also provided for generating electronic reticles for a ballistic sight system. The ballistic sight system may be an imaging sight system such as a thermal imaging riflescope. The riflescope may capture thermal images of a target scene and generate an electronic reticle that is readily visible in contrast with the scene.

The electronic reticle may have a color, size, and/or shape that maximize its contrast with respect to the target scene. Captured thermal images and the reticle may be displayed to an operator of the rifle on a common display. In some embodiments, a reticle may be generated and displayed that extends through the target in both vertical and horizontal axes and maximizes contrast between the reticle and the target or scene behind the target. The reticle may be displayed in line with a direct view of the target scene through the scope or overlaid or otherwise combined with an image of the target scene.

The reticle may be selected by a user for a given scene, target type, ballistics condition, environmental condition, or other criteria or the reticle may be generated by the system in response scene information, a target type, a ballistics condition, an environmental condition or other information provided by the user or determined by the system based on captured images and/or data from other sensors such as a rangefinder or environmental sensor such as a wind speed sensor.

Figure 4A:
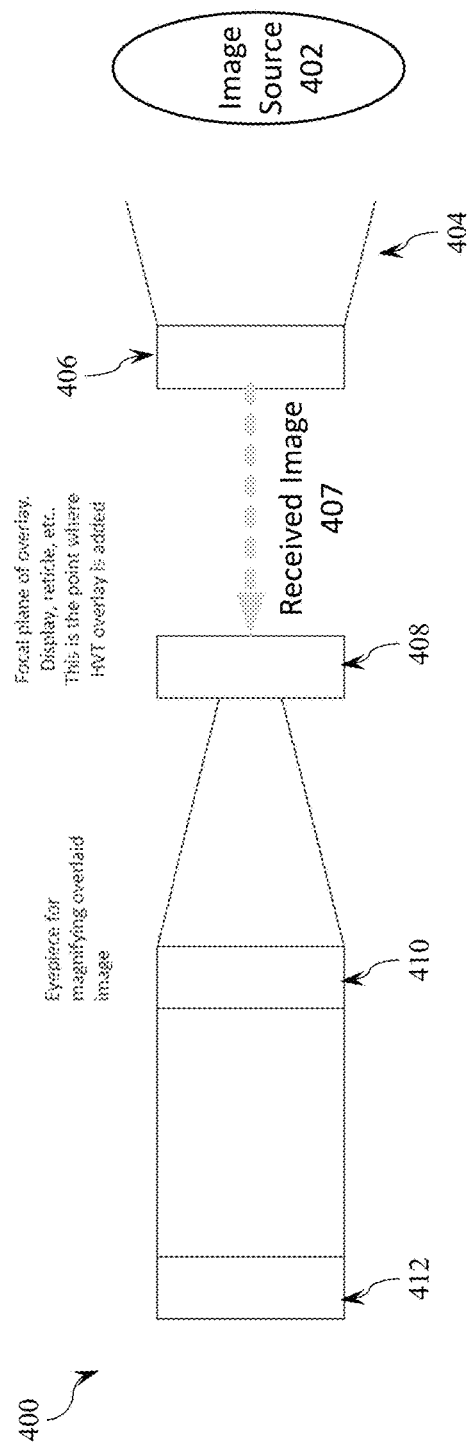
FIG. 4A illustrates an exemplary embodiment of an image viewing system including a magnification, in accordance with an embodiment.
Figure 4B:
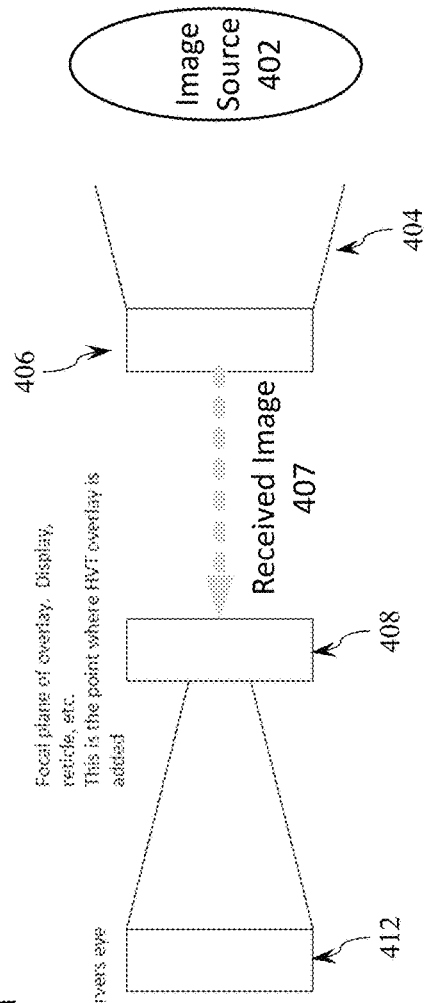
FIG. 4B illustrates an exemplary embodiment of an image viewing system for direct viewing of the image, in accordance with an embodiment.

Embodiments of a high visibility overlay system will now be described in accordance with FIGS. 4A, 4B, 5A, 5B and 5C. FIG. 4A illustrates an exemplary magnified high visibility overlay system 400. An image source 402 within a field of view 404 is received at block 406, which may be an image sensor (electrical) or lens (optical), for example, in alternate embodiments. The received image 407 is presented to a user at block 408, which may include a display, reticle or other element for providing an image to a user. The overlay is added to the displayed image which is presented to the user. The observer looks through one end 412 of an eyepiece 410, which magnifies the overlaid image for the observer. In FIG. 4B, the system 420 is a direct viewing system allowing the observer to look directly at the focal plane 408 without magnification.

Figure 5B:
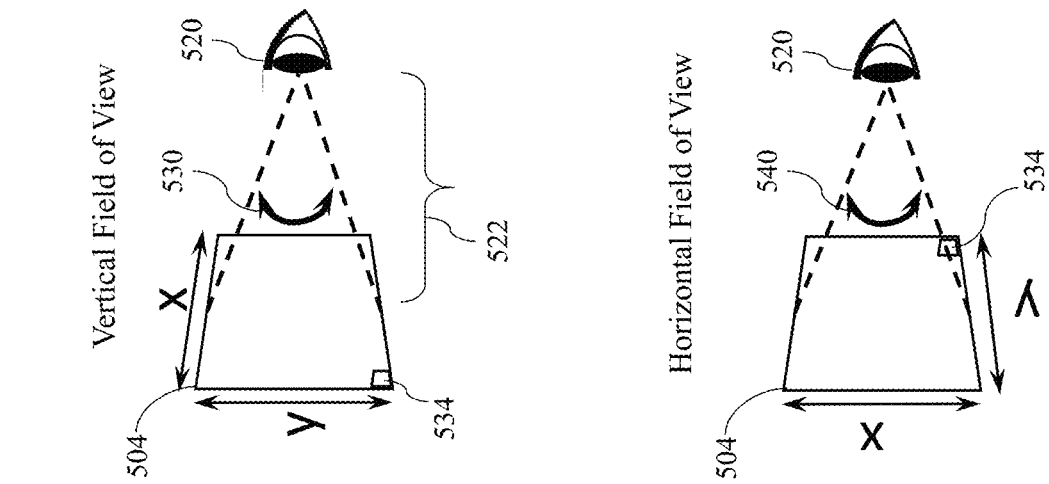
FIGS. 5A and 5B are block diagrams illustrating an exemplary operation of a highly visible overlay system, in accordance with an embodiment.
Figure 5A:
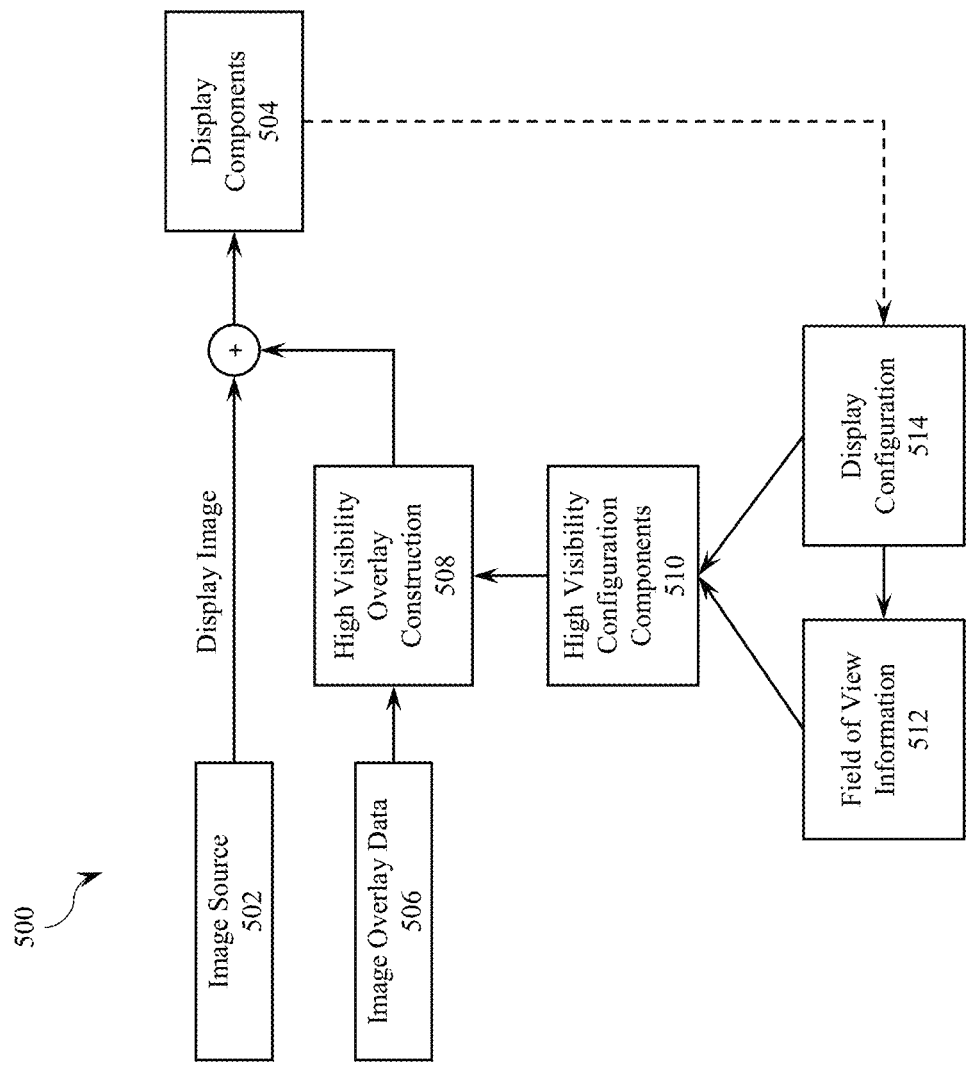

An embodiment of a system 500 for constructing the highly visible overlay is illustrated in FIGS. 5A and 5B. A display image is provided by an image source 502 for viewing on display components 504, such as a video monitor, rifle scope, medical imaging display or other display. The display image is overlaid with image overlay data 506, such as close captioning text for a movie to be displayed on a television, reticle and ballistics information for a rifle scope, patient information for a medical image, or other overlay data.

The image overlay data 506 is provided to the high visibility overlay construction components 508 which construct the image overlay using high visibility elements defined by high visibility configuration components 510. The high visibility configuration components 510 use display configuration data 514 and observer field of view information 512 to define contrasting high visibility elements that are discernible by an observer of the displayed image.

As illustrated in FIG. 5B, an observer 520 views the display 504 at an expected viewing distance 522 from the center of the display 504. From this location, the observer 520 has a vertical field of view 530 and a horizontal field of view 540, each which may be measured in arc-minutes, degrees or other similar units of measure. Generally, a person with 20/20 vision can observe details (e.g., edges of contrasting elements) as small as one arc minute, however, observers may differ in their visual acuity (e.g., a given observer may be able to identify edges of contrasting elements at resolutions of 5 arc-minutes or higher). It is further recognized that a typical person's horizontal visual acuity is stronger than the person's vertical visual acuity, resulting different visual horizontal and vertical acuities.

The high visibility configuration components 510 use the field of view information 512 and display configuration data 514 to define visual elements discernible by the observer 520. The display 504 has a resolution measured in pixels (x,y). In one embodiment, the number of horizontal pixels x in the horizontal field of view are divided by the horizontal field of view as measured in arc-minutes (HFOV) to obtain a number of horizontal pixels per arc-minute. Similarly, the number of vertical pixels y is divided by the vertical field of view as measured in arc-minutes (VFOV) to obtain the number of vertical pixels per arc-minute. Thus, in the present embodiment the smallest discernible unit can be defined as a block of pixels 534 having a width of a horizontal visual acuity factor (e.g., 1 arc-min) times [x÷HFOV], and a height of a vertical visual acuity factor (e.g., 1 arc-min) times [y÷VFOV].

In various embodiments, the high visibility elements may have other shapes, such as rectangular, circular, or square with rounded corners, provided the size of the high visibility element is discernible within the range of the observer's visual acuity. In other embodiments, different vertical and horizontal visual acuity factors may be used, which can affect the size and shape of the high visibility elements. The visual acuity factors may be set or adjusted by an observer based on the observer's own visual acuity, or by the system based on environmental, system and/or user data. In various embodiments, it is desirable to set the visual acuity factor to a value resulting in the smallest visible element for the observer, thereby reducing the size of the overlay and minimizing obstructions to the background image.

Figure 5C:
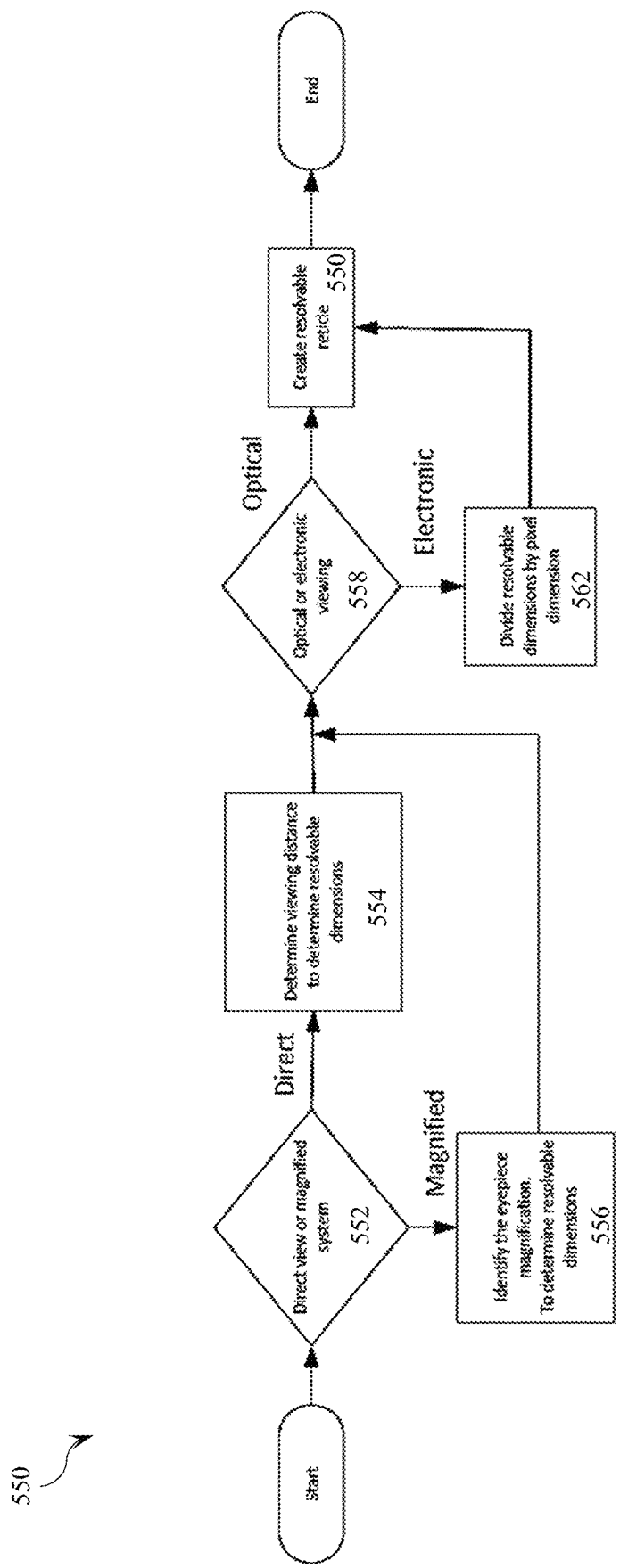
FIG. 5C is a flowchart of illustrative operations for generating a visible reticle, in accordance with an embodiment.

Referring to FIG. 5C, an embodiment of a method 550 for constructing highly visible contrasting elements for a reticle will be described. In step 552, a determination is made whether the system will be directly viewed or viewed through a magnifier or other optical elements. If the image is viewed directly, then the viewing distance is determined in step 554, which is then used to determine field of view information as described above. If the image is magnified, then in step 556 the eyepiece magnification and viewing distance are determined and used to determine field of view information.

In step 558, it is determined whether the system employs optical or electronic viewing. If the system provides optical viewing then a visually resolvable reticle will be created in step 550, constructed of highly visible contrasting elements that are sized for an observer's visual acuity factor in the field of view. In an electronic system, the visually resolvable dimensions are converted to display pixels in step 562 before a reticle is constructed of highly visible contrasting elements that have a pixel size for a given visual acuity factor in the field of view.

It is observed that contrast sensitivity and spatial resolution are better along the horizontal mid-line of the visual field than along the vertical mid-line. The calculation of visual acuity may thus include different horizontal and vertical values or, in other embodiments, a singular value may be used for both horizontal and vertical acuity (e.g., the vertical sensitivity may be used for both).

In some embodiments, the brightness of the environment or displayed image may affect the visual acuity factor. For example, the brighter the overall image or viewing environment, the smaller the pupil, which results in greater visual acuity. The age of the observer may also effect visual acuity by limiting the range that the pupil can dilate. In one embodiment, the lighting condition, whether known, sensed or calculated (e.g., a calculation of the brightness of the display image) during operation, may be used to adjust the visual acuity factor during operation. In other embodiments, a user interface is provided allowing the user to adjust the visual acuity factor for the user's own visual acuity, making the highly visible contrasting elements larger or smaller as desired.

Figure 6A:
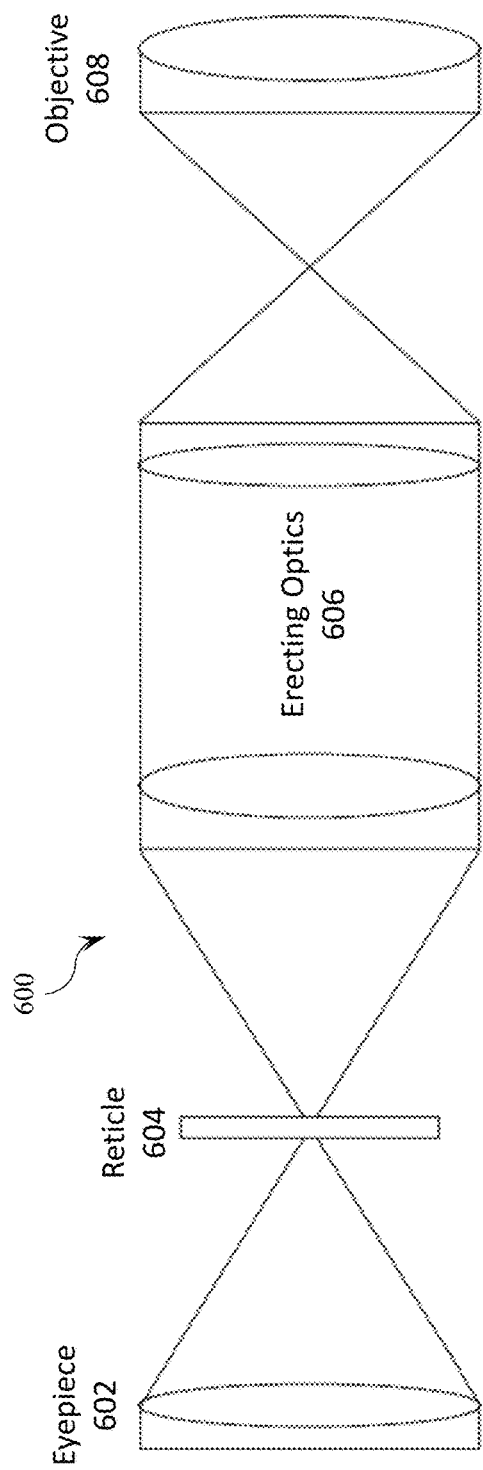
FIGS. 6A and 6B illustrate exemplary embodiments of an image viewing system including a reticle constructed in accordance with an embodiment.
Figure 6B:
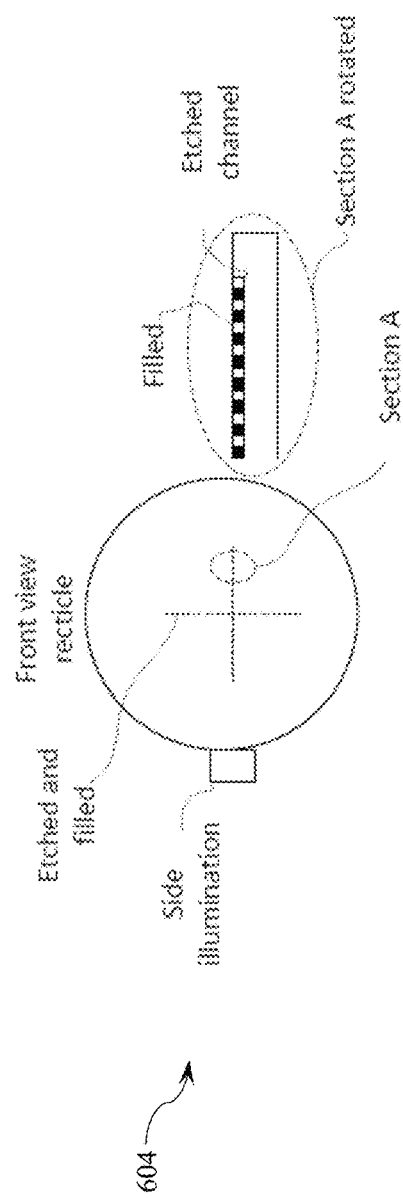

FIGS. 6A and 6B illustrate an optical telescopic weapons site 600 using high visibility overlay technology. The operator looks through the eyepiece 602 to locate a target objective 608, which is viewable through erecting optics 606 and a reticle overlay 604. The reticle 604 includes a plurality of lines used for measuring scale and distance and for targeting the objective 608. In one embodiment, the reticle is formed as an etched channel in the glass and filled to form a pattern of highly visible contrasting elements. The size and shape of the highly visible contrasting elements may be selected in accordance with the methods disclosed of FIGS. 5A-C.

Figure 7:
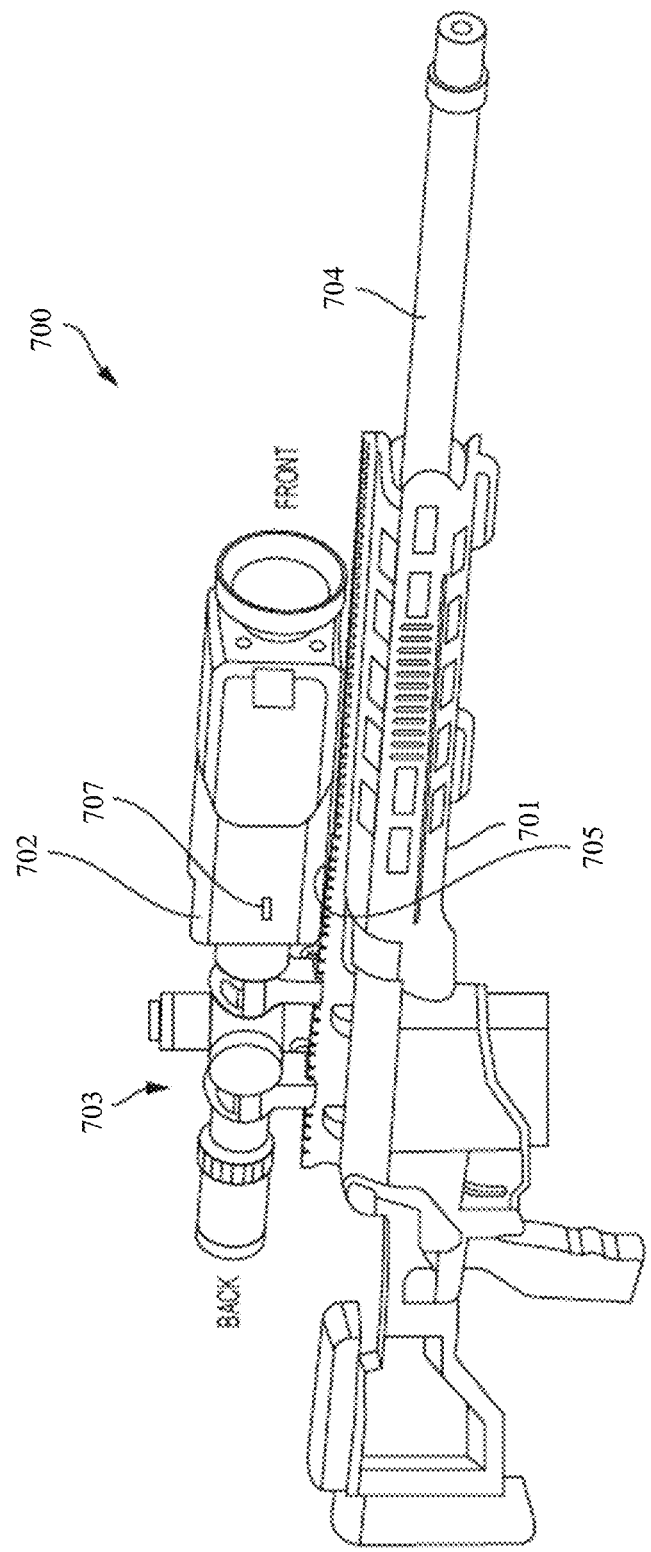
FIG. 7 shows a system having a scope mounted to a rifle, in accordance with an embodiment.

FIG. 7 shows an exemplary system 700 using high visibility overlay technology that includes a rifle 701, and a scope 702 in accordance with an embodiment of the invention. The rifle 701 can be a sniper rifle, such as a 50 caliber Barrett M82A1 or an M107 Long Range Sniper Rifle (LRSR), for example. Although a high power, long range rifle is illustrated, the high visibility overlay system can be used with any rifle, handgun or other type of firearm provided in any caliber.

Figure 8:
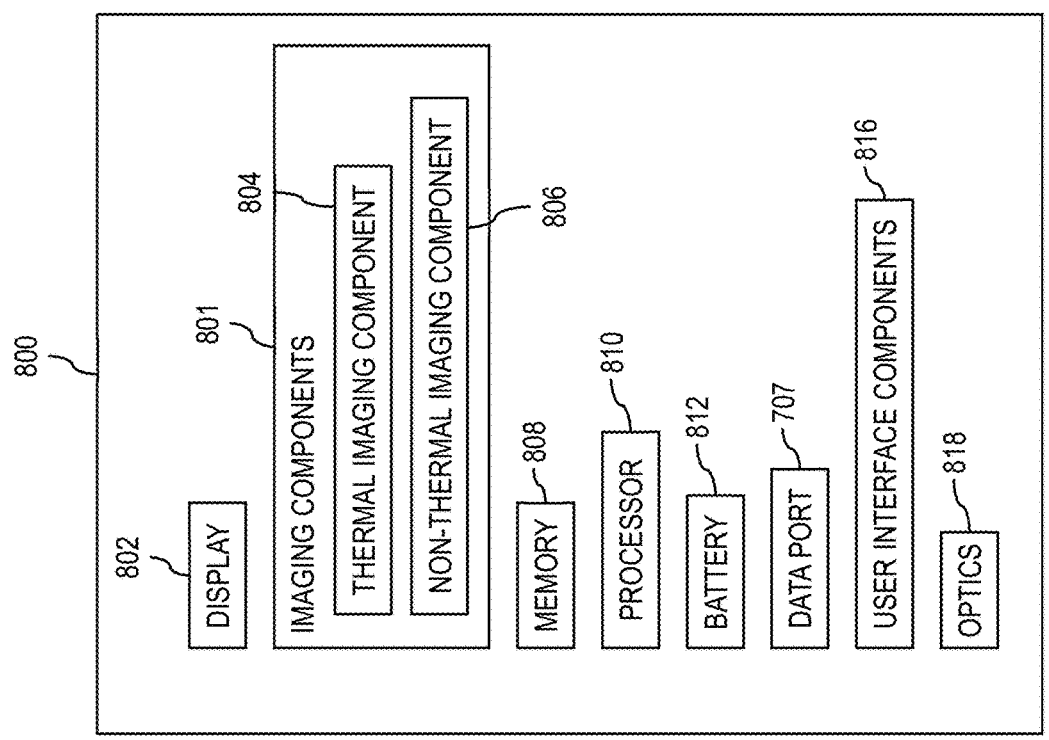
FIG. 8 shows a block diagram of a high visibility processing system in accordance with an embodiment.

The scope 702 can mount in parallel with the barrel 704 of the firearm 701. Thus, the scope 702 can view the target scene at which the rifle is aimed and can provide a direct view of the scene and/or an image of the scene along with an electronic reticle with a display component such as display 702 (FIG. 8). Display 702 may be disposed at a rear end of the scope 702 so that the display may be viewed by a user of the firearm when aiming the firearm at a target.

As shown in FIG. 7, optics 703 can be provided to facilitate viewing of the display of the scope 702. However, this is merely illustrative. In various embodiments, the user may directly view the display of the scope.

In various embodiments, scope 702 may be a thermal imaging riflescope having a thermal imaging camera, a direct view scope and/or may include a visible light camera, an ultraviolet camera, an infrared camera (such as a thermal infrared camera, a non-thermal infrared camera, a near infrared camera, a far infrared camera, a short wavelength infrared camera, a medium wavelength infrared camera, or a long wavelength infrared camera) or any other type of camera or imaging device that can provide an image of a target scene. Scope 702 may include processing circuitry and display circuitry for generating and displaying an electronic reticle in combination with any suitable camera image or direct view of a target scene. In embodiments in which the scope is a direct view scope, the reticle may be generated with a display component that is a transparent or semitransparent optical element through which the user views the scene directly (e.g., a semitransparent liquid crystal or light emitting diode element mounted in line with other optical elements (e.g., lenses) of the scope) or with a display component that projects the reticle onto another optical element (e.g., a lens or eyepiece) of the scope or directly into the eye of the user.

The scope 702 can be used with passive or active illumination by the scope. The camera can be used with natural illumination such as sunlight, starlight, or moonlight. The camera can be used with artificial illumination, such illumination provided by an infrared light source.

The scope 702 may include an input port 707 for receiving an external device such as universal serial bus (USB) device. For example, a USB device may be coupled with a data input port such as port 707 to provide ballistics information and/or other sensor information to scope 702 for generating ballistics tables and/or other ballistics information for generating a reticle. The scope 702 can attach to the rifle 701 via scope mounting structures 705 such as a Picatinny rail.

FIG. 8 is a block diagram showing components that may be included in scope 702 according to an embodiment. As shown in FIG. 8, a highly visible overlay system 800 may include imaging components 801, a display 802, memory 808, a processing component such as processor 810, a power source such as a battery 812, data port 707, and user interface components 816.

Imaging components 801 may include a thermal imaging component 804 (e.g., a cryo-cooled indium antimonide (InSb) imager or a microbolometer array) and/or a non-thermal imaging component 806 (e.g., a charge coupled device (CCD) imager or a complementary metal oxide semiconductor (CMOS) imager).

Imaging components 801 can provide electronic image signals to processor 810. The processor 810 can be a general purpose processor, a dedicated processor, or any other type of processor. The processor 810 can control functions of the imaging components, such as focusing and/or zooming of the imaging components.

The processor 810 can provide an electronic output to the display 802. The display 802 can show images captured by the imaging components 800. Processor 810 may generate an electronic reticle and/or other overlay graphics, text and symbols and provide the generated overlay to display 802 for display in combination with one or more images from imaging components 800.

The display 802 can be an organic light emitting diode (OLED) display, a light emitting diode (LED) display, or a liquid crystal display (LCD) (as examples). In alternate embodiments, the display 802 can be any other type of display, such as a high resolution (OLED) display, and can have a variety of resolutions capable of displaying an image with overlays, such as a resolution of 600×1024, 480×800, 800×1280, 1746×1000, 1024×1024, 2048×2048, or more. Optics 818 can provide a direct view of a target scene through the scope 802 and/or facilitate viewing of the display 802.

The processor 810 may be configured to generate an electronic reticle and/or other overlay based on user input information, ballistics information and/or scene information in a captured image such as a thermal image. Processor 810 may receive external information such as ballistics information for a particular firearm and/or ammunition type via data port 707 and may store the received information using memory 808 (e.g., volatile or non-volatile memory).

User interface components 816 may include one or more buttons, switches, or other input and/or output components for receiving input from a user and/or providing output information to the user. User interface components and/or port 707 can be used to provide firearm information, ammunition information, target information, range information, bullet drop and/or windage information to the processor 810. Processor 810 may generate the electronic reticle based on the provided information and/or based on scene content (e.g., in a capture image of the target scene).

Figure 9:
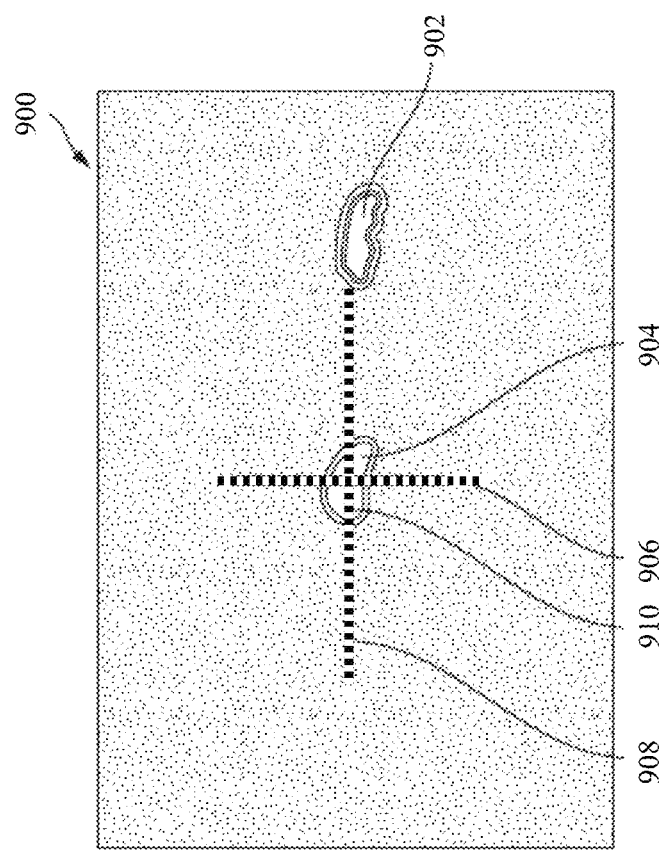
FIG. 9 shows an illustrative scope image with an example of an electronic reticle, in accordance with an embodiment.

In the example of FIG. 9, a target scene image 900 is shown that may be generated by scope 702. As shown, target scene image 900 may include one or more target objects such as targets 902 and 904 (e.g., animals in the example of FIGS. 3A-E) and a highly visible electronic reticle 906. For example, image 900 may be a thermal image of a target scene with target objects 902 and 904. In order to increase the visibility of reticle 906, particularly in the central crosshairs region when the crosshairs of the reticle are in line with a target such as target 904, the reticle may be generated having contrasting elements as described herein so that the reticle is visible over the image 900 regardless of the background characteristics. The size of the contrasting elements may be calculated for minimal size and visibility as described herein.

In the embodiment shown in FIG. 9, reticle 906 includes crosshairs that extend through the target 904 in both vertical and horizontal axes and maximizes contrast between the reticle and the target. In various embodiments, the reticle 906 can also include a plurality of tick marks or other features created with contrasting elements, such as bullet drop tick marks on the vertical member as discussed further hereinafter. Windage tick marks can similarly be provided on the horizontal member of the reticle 906.

Figure 10:
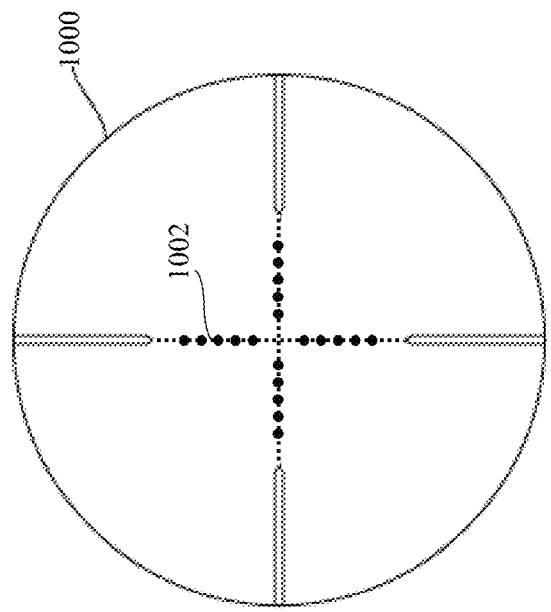
FIG. 10 shows an example of an electronic Mil-Dot reticle, in accordance with an embodiment.

The visual enhancement discussed herein may be included or combined with ballistics features of the reticle. For example, as shown in FIG. 10, an electronic reticle may be an electronic Mil-Dot reticle 1000 for rangefinding. Mil-Dot reticle 1000 may include ballistics features such as beads 1002 on the reticle that are, for example, spaced 1 milliradian (or Mil) apart. By looking at the number of milliradians that a target subtends, and knowing the actual height of the target, one can estimate the range to the target and compensate for bullet drop based on the estimated range. For example, a typical human male may be about 1.8 yards tall. If he subtends 5 milliradians as measured by the Mil-Dot reticle, then he may be approximately 360 yards away, and a shooter can hold over by the correct number of Mils to compensate for the bullet drop at 360 yards. Depending on the caliber and the length of the barrel, the holdover might be, for example, 2.5 milliradians. Mil-Dot reticle 1000 may be constructed of contrasting elements as described herein.

Figure 11:
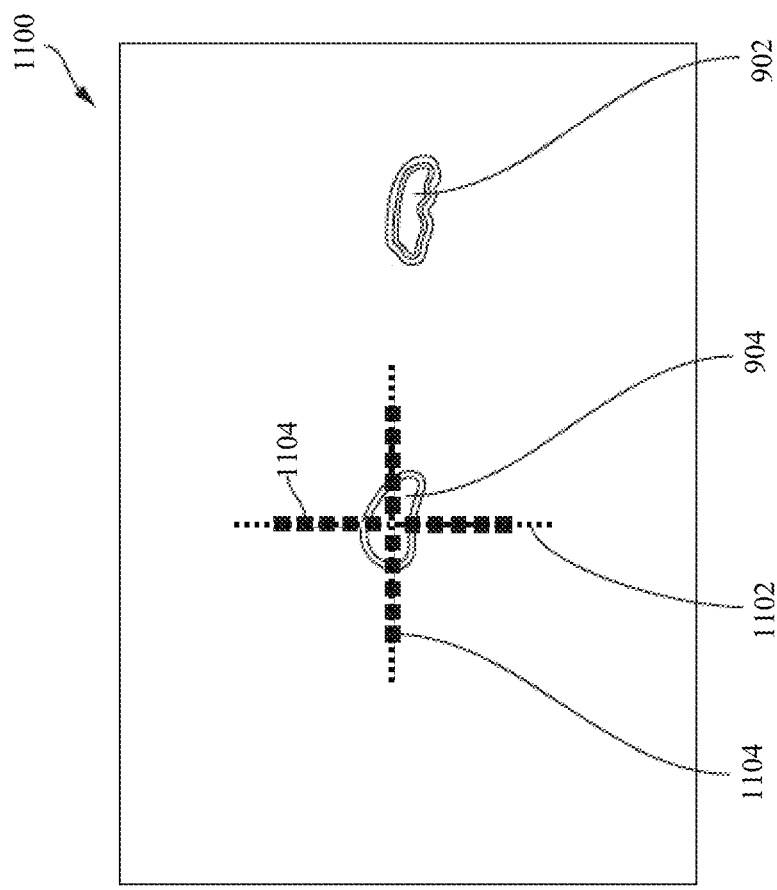
FIG. 11 shows an illustrative scope image with an example of an electronic Mil-Dot reticle with square dots, in accordance with an embodiment.

In another embodiment, beads 1002 may be replaced with other patterns and/or shapes such as squares 1104 in a modified Mil-Dot reticle 1102 as shown in image 1100 of FIG. 11. The pattern of dots 1002 or 1102 may be rescaled when an imaging component is zoomed in or out.

In some embodiments, a rangefinder such as a laser rangefinder may be included and/or attached to the scope so that data from the rangefinder is fed into the electronics of the scope to determine elevation changes for the reticle. For example, a reticle may be moved up or down in the scope view in response to the rangefinder range input. The reticle may be moved up or down based on ballistics information such as user-provided ballistic tables (e.g., tables loaded into the system through the USB interface) for their particular gun and ammunition so that the user can place the center of the crosshairs on the target rather than placing the target a hold location other than the center of the crosshairs.

The user may be provided with the ability to upload a range-selective reticle that is designed for their gun's ballistics. These reticles may also include other ballistics features such as windage markings for wind holds, also tailored to the gun and particular ammunition.

Figure 12:
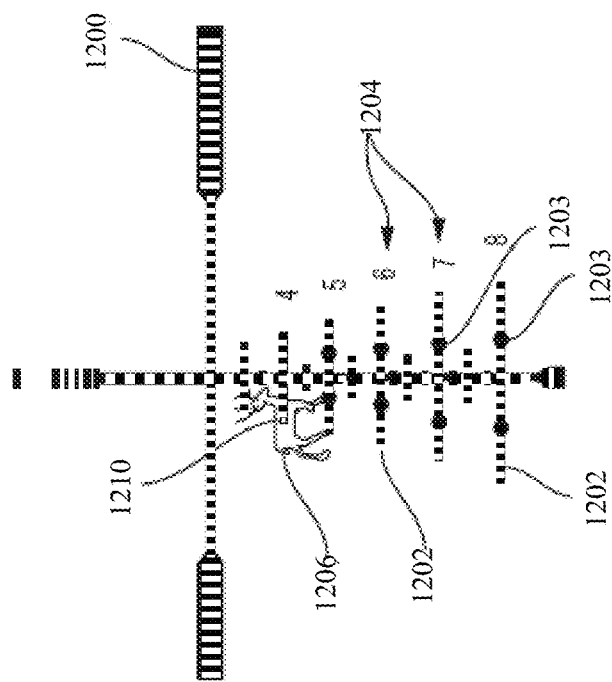
FIG. 12 shows an example of an electronic reticle suitable for bullet drop and windage adjustments, in accordance with an embodiment.

An example of such as reticle is shown in FIG. 12. As shown in FIG. 12, a highly visible reticle 1200 may be generated and displayed with a direct view or an image of a target such as a deer 1206. In the example of FIG. 12, the deer 1206 is located at a range of 400 yards with, for example, a 4 mph wind hold.

As shown in FIG. 12, reticle 1200 has ballistics features such as markings 1202 along the vertical axis for 400, 500, 600, 700, and 800 yard holds. The shooter may elevate the rifle to line the target up with the reticle at the appropriate range, which, for example, can be determined with an included or separate laser rangefinder. The holds may be indicated by a numerical indicator 1204 for each hold. Reticle 1200 may also include additional ballistics features such as dots 1203 to the left and right of the center vertical line on each marking 1202 that indicate wind holds (e.g., wind holds in wind speed increments such as 10 mph increments of wind speed) at that range.

For example, using the USB interface 107 (see, FIGS. 7 and 8), a user may upload a custom reticle. The custom reticle may be a reticle obtained as a download from, for example, a manufacturer website. Downloadable reticles may be provided by the scope manufacturer for, for example, various standard hunting rifles and hunting loads.

As shown in FIG. 12, reticle 1200 may be displayed along with a target indicator 1210. Target indicator 1210 may be displayed at the location of the target based on detection and tracking of the target in captured images such as thermal images. For example, a target may be detected in a thermal image based on a temperature above a particular temperature threshold and/or an intensity value above an intensity threshold. Once detected, the location of the target may be tracked using subsequently captured (e.g., continuously captured) thermal images.

A shooter may use the image of the target, the target indicator, and/or the reticle markings to achieve bullet drop and windage compensation when aiming at the target. For example, the shooter can use tick marks 1202 below the crosshair to compensate for bullet drop when aiming at such a distant target and marks 1203 on the reticle for windage adjustments.

However, in some situations it may be undesirable to use reticle markings other than the crosshair when shooting at long distances. Errors can be made in determining which of the tick marks to use then in using the correct tick marks when shooting. Further, an aim point may not actually be at a particular tick mark, but rather may be between tick marks or off to the side of the tick marks. Determining the correct tick mark and then using the tick mark correctly can therefore be difficult, especially in combat situations. In some embodiments, reticle 1200 or other electronic reticles as described herein may be moved based on ballistics, range, and/or windage information so that, when the user moves the firearm to place the crosshair on the target, bullet drop and windage corrections have already been made. In these embodiments, the crosshair may, for example, be moved to a location other than the center of the scope.

In some embodiments, image processing may be performed to detect the presence of a potential target within a region of interest (ROI) in an image. The region of interest and the potential target may be indicated using the display with a target indicator. For example, a blob or blobs having a particular temperature or temperature range inside a region of interest may be detected and a target indicator may be drawn or otherwise presented at the locations of the centroids of non-connected blobs inside the ROI.

Figure 13B:
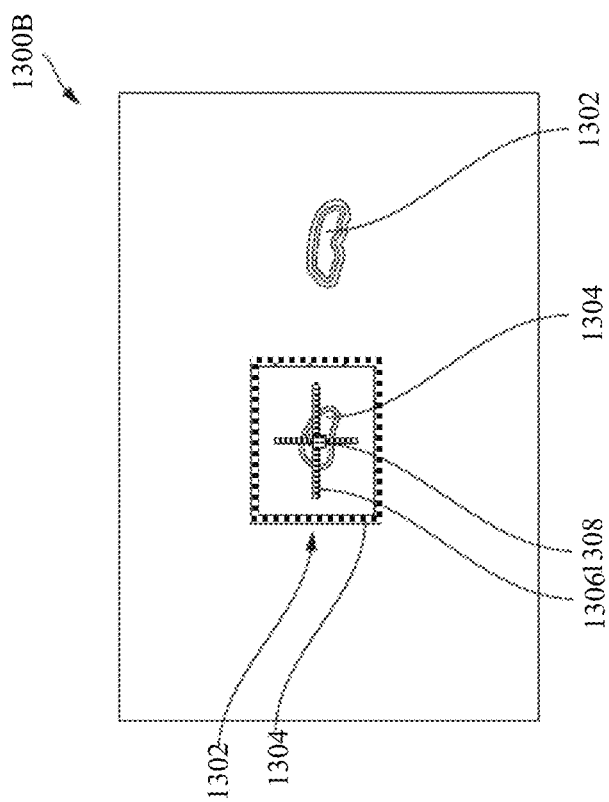
FIG. 13B is an illustrative scope image showing how the region of interest indicator of FIG. 13A can provide an alignment alert, in accordance with an embodiment.
Figure 13A:
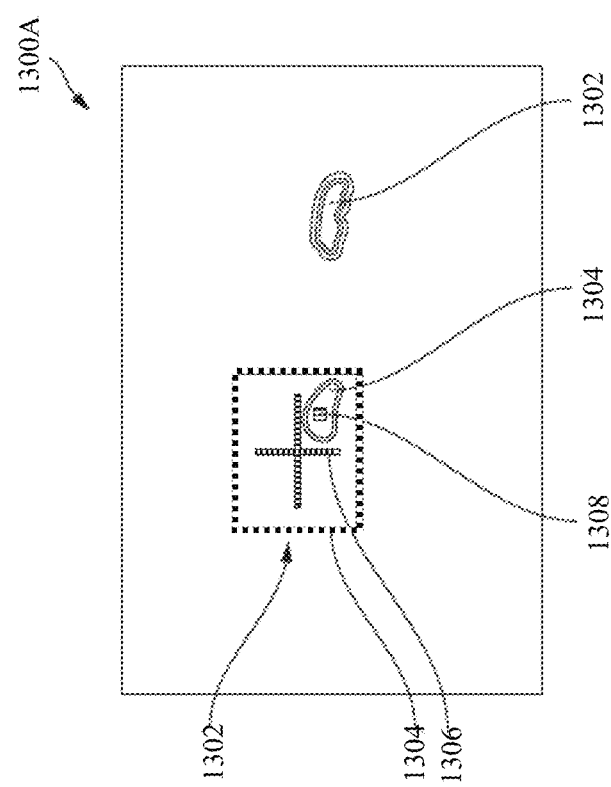
FIG. 13A shows an illustrative scope image with an example of an electronic reticle having a region of interest indicator, a target indicator, and crosshairs, in accordance with an embodiment.

FIG. 13A shows an exemplary image 1300A having targets 1302 and 1304 with a target indicator 1308 displayed on the target 1304 in a region of interest indicated by ROI indicator 1304. An electronic reticle 1302 may include ROI indicator 1304, target indicator 1308, and crosshairs 1306. Any or all of ROI indicator 1304, target indicator 1308, and crosshairs 1306 may be provided with any of the enhanced visibility features described herein.

As shown in image 1300B of FIG. 13B, when a user moves the riflescope reticle 1302 into position so that the target indicator 1308 is coincident with the center of crosshairs 1306, the one or more portions of the reticle (e.g., crosshairs 1306, ROI indicator 1304 and/or target indicator 1308) may blink to indicate target lock. In this way, a shooter would be notified that it is time to press the trigger for that target.

Figure 14:
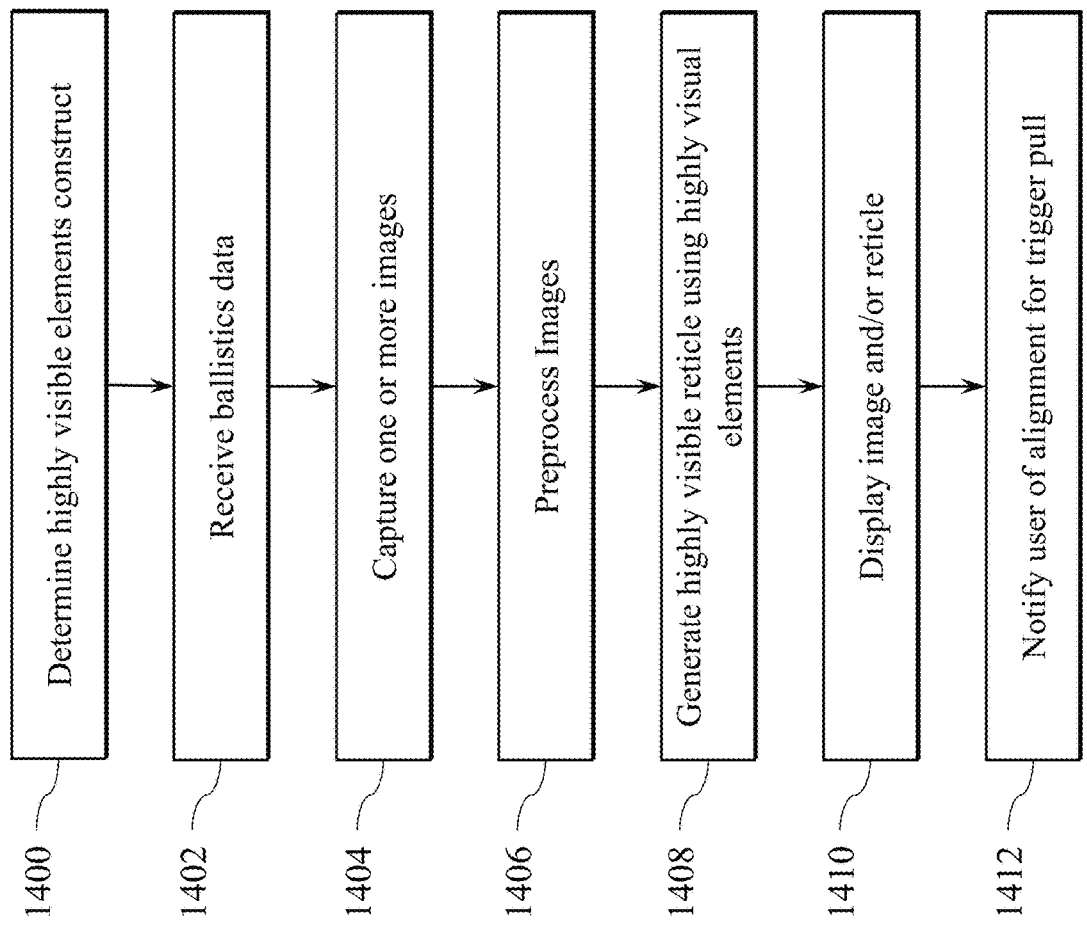
FIG. 14 shows a flowchart of illustrative operations for operating a rifle scope having a highly visible electronic reticle, in accordance with an embodiment.

Illustrative operations that may be performed providing an electronic reticle are shown in FIG. 14 according to one or more embodiments. At block 1400, a highly visual elements construct is determined based on the configuration of the device, including the scope dimensions, field of view and/or observer information. In one embodiment, the highly visual element construct determines a minimum size for the highly visible contrasting elements to be viewed on the display. The determination may use data such as firearm specifications provided by the scope such as a riflescope such as an imaging riflescope as described herein in connection, for example, with FIGS. 7 and 8.

As block 1402, ballistics data such as firearm specifications and ammunition specifications may be received by a firearm scope. The ballistics data may include table data uploaded to the scope by a user via an input port such as a USB port of the scope. Before and/or after the ballistics data is received, the scope may be mounted to a firearm. The ballistics data may include velocity, energy, and/or trajectory information for various cartridges, bullets, and firearms including the particular firearm and/or ammunition to be used.

At block 1404, one or more images may be captured. Captured images may include one or more thermal images and/or one or more non-thermal images. The images may be captured by an imaging component of the scope.

At block 1406, the captured images may be preprocessed. Preprocessing of the capture images may include analog to digital conversion operations, gain operations, noise reduction operations, non-uniformity correction operations, multi-spectral image combination operations, flat fielding operations, and/or other suitable image processing operations.

At block 1408, a highly visible reticle may be generated by the scope using the determined highly visible overlay construct. The reticle may be an adaptive electronic reticle. The reticle may be generated based on the captured and/or preprocessed images, user settings, ballistics information, target information such as target range information, wind information or other information associated with the firearm, the target, the images, scope optics, and/or environmental conditions as described, for example, herein.

At block 1410, the generated reticle may be displayed. The reticle may be displayed in line with a direct view of a target scene (e.g., generated by a semitransparent display component that allows the user to see the target scene directly through the optics of the scope with the electronic reticle visible on the direct view target scene) and/or overlaid or otherwise combined with an image of the scene such as one or more of the captured and/or preprocessed images. The generated reticle may be constructed using high and low contrast color blocks and include other information such as ballistics features, indicators such as target indicators or region of interest indicators as described herein.

At block 1420, a notification may be provided to a user of the firearm of target alignment for a trigger pull. For example, providing a notification to the user may include altering the appearance of the displayed reticle (e.g., by blinking, changing the size of the construct images or otherwise altering one or more portions of the reticle) when a detected target is aligned with the desired aiming position of the firearm. For nearby targets the notification may be provided when it is determined by the scope that the target is aligned with the barrel of the firearm as indicated by alignment of the target, for example, with the center of crosshairs at the center of a scope aligned with the barrel. For distant targets, the notification may be provided when it is determined by the scope that the target is aligned with a bullet drop or windage corrected position of the firearm as indicated by alignment of the target, for example, with the center of crosshairs at a corrected position other than the center of a scope aligned with the barrel or by alignment of the target, as another example, with a bullet drop and/or windage position hold position located away from the center of crosshairs that are located at the center of the scope.

Figure 15:
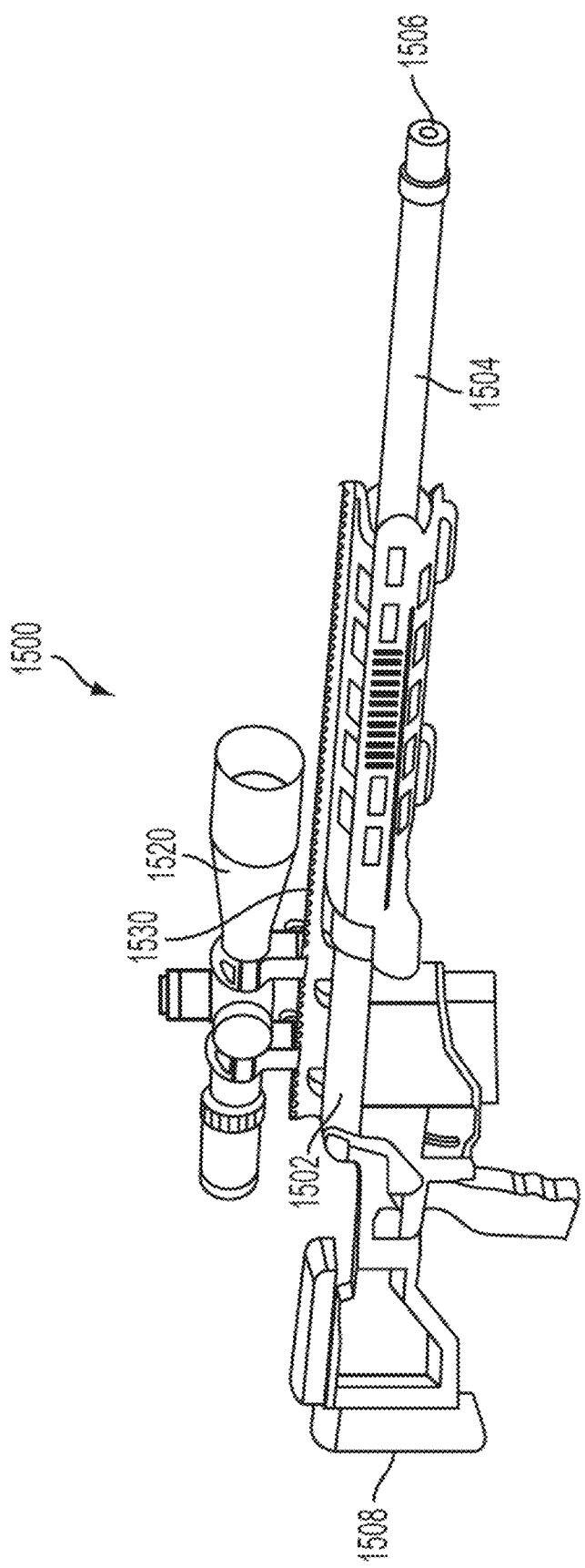
FIG. 15 shows an illustrative scope mounted to a rifle, in accordance with an embodiment.

FIG. 15 shows an example firearm system 1500 with a ballistic sight system that includes a rifle 1502 having a front end 1506 and a rear end 1508, and a scope 1520 attached to the rifle, in accordance with an embodiment. In the example of FIG. 15, the rifle 1502 can be a sniper rifle, such as a 50 caliber Barrett M82A1 or an M107 Long Range Sniper Rifle (LRSR), for example. Although the ballistic sight system is particularly well suited for use with high power, long range rifles, the ballistic sight system can be used with any rifle, handgun or other type of firearm provided in any caliber.

The scope 1520 can be any scope that is compatible for use with the rifle 1502. The scope can be a unity power scope, a low power scope, or a high-power scope. The scope 1520 can attach to the rifle 1502 via a rail 1530 (e.g., a Picatinny rail). The scope 1520 can be mounted in line with a barrel 1504 of the rifle 1502 so that the scope has a field of view in front of the rifle.

The scope 1520 includes a reticle constructed of contrasting visual elements which may be defined based on the scope configuration and specifications and the observer's field of view and visual acuity to provide enhanced visibility and function of the reticle for the observer. The reticle may be implemented as a mechanical structure in the line of sight of the scope such as crosshairs on etched into transparent glass or a plastic member of the scope.

The reticle may be difficult to see against certain target backgrounds viewed through the scope. Further, the reticle may be difficult to see as the field of view scans across certain contrasting target backgrounds.

In the daytime, for example, reticles may have a problem maintaining contrast with the target background. A target background may include bright areas in sunlight and darker areas in the shade. A non-illuminated reticle may be not be sufficiently visible against a dark background, while an illuminated reticle loses contrast when viewed against a bright background. In a conventional approach, the shooter can affect the visibility of the reticle by changing the illumination, but this may require the shooter to regularly adjust the illumination to accommodate changing target backgrounds.

In one embodiment, a reticle includes a complete opaque line on top of which is placed a dashed illuminated line. This creates a dashed opaque and illuminated line that provides contrast with the scene regardless of the brightness of the scene. A conventional solution for displaying a reticle for a bright scene is to have a more brightly illuminated reticle. Embodiments of the present disclosure, however, do not require a brighter reticle.

In one embodiment, the reticle pattern has a high contrast to the scene when viewed through the scope. The reticle pattern includes a dashed line where the part of the dashed line is illuminated, and the other sections are not illuminated, but are opaque. The dashed lines are specifically engineered to provide the contrast with the background and allow the viewer to be able to discern the reticle pattern while viewing the scene through the scope.

The combination of brightness difference, size, and visual acuity defines a lower limit of visibility. In one embodiment, elements of a reticle are defined to allow for resolution of individual light and dark sections of the dashed line. Below this limit, the bright and dark sections merge in the observer's vision to create a line of intermediate brightness. When this merged line passes through an area with too little luminous difference from the line it will be lost in the background.

In one embodiment, to maintain visibility the reticle line maintains contrast to itself. Referring to FIG. 16A, a reticle 1602 is constructed from graphics elements that contrast in brightness. For example, an image of a white crosshair 1604 would be visible against a dark background but may disappear or be difficult to see when the target background bright (e.g., clear blue sky). A black crosshair 1606 may be visible against a bright background but be difficult to see when the target background is dark, such as an area in the shade. A line constructed of elements having contrasting luminance (e.g., alternating black and illuminate white) can be seen crossing all the areas. In various embodiments, the crosshair is constructed of contrasting elements such that the human brain completes the "missing information" perceives a full crosshair.

Figure 16B:
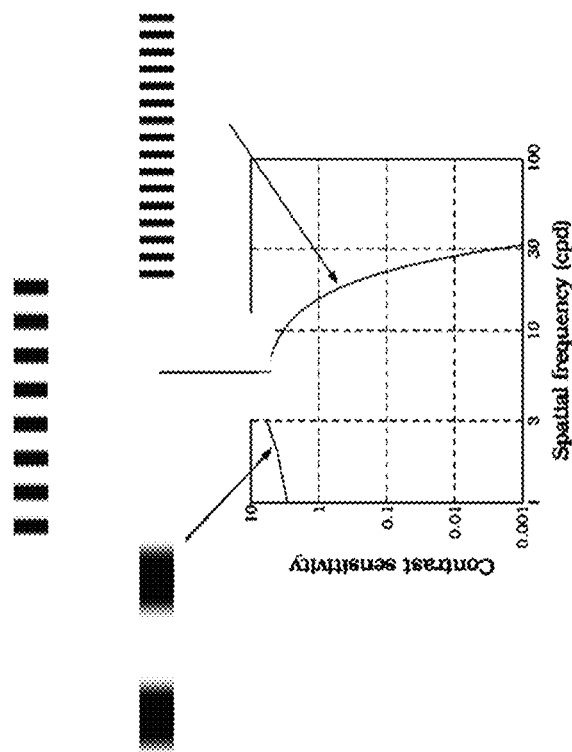
FIG. 16A-B illustrates a relationship between contrast sensitivity and spatial frequency in accordance with an embodiment.
Figure 16A:
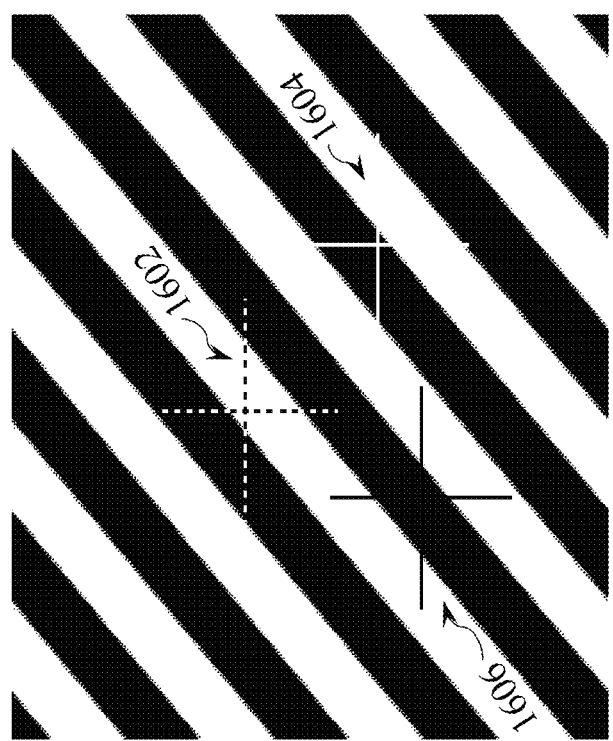

Referring to FIG. 1 and FIG. 16B, human perception of an edge is based on the amplitude modulation of the brightness (luminous) difference between the two sides of the edge. The ability to perceive an edge varies with the frequency of the modulation. As we close in on the resolving limit of the viewer, the brightness difference between background and data may need to be increased to enhance visibility. For example, while reading in low light, we need to either increase the light or increase the letter size for easier reading. As illustrated in FIG. 16B, contrast amplitude is shown in the vertical axis, while spatial frequency is shown in the horizontal axis. It is observed that for medium frequencies, less contrast is needed than for high or low frequencies to detect the contrasting pattern.

In one embodiment of a day scope, the illumination of the reticle is only needed for lower brightness areas. In high brightness areas, the opaque elements of the reticle provide the contrasting information. In this manner, the reticle has a larger dynamic range than a conventional illuminated reticle and manual illumination adjustments are not needed or rarely necessary, avoiding saturating the viewer with an over illuminated reticle and letting the user stay on target.

In one embodiment, the reticle provides luminance contrast (e.g., luminance difference divided by average luminance) between the reticle and the background, and luminance contrast between elements in the pattern that make up the reticle. The perception of luminance contrast in the reticle may greater luminance difference at high levels of luminance and smaller luminance differences at lower levels of luminance. Reticle lines formed in accordance with the present disclosure provide constant contrast with every background and are always visible in daylight conditions.

Referring to FIG. 6B, the reticle may include and etched and filled channel in an optical element. The reticle form may include standard reticles and provide information such as windage, range, and other information. The reticle includes a pattern that includes an opaque pattern and a pattern that is illuminated by side illumination. In one embodiment, the nonilluminated pattern includes opaque paint (e.g., black) that is visible against bright backgrounds without illuminations. The illuminated pattern may be formed by etching the pattern into glass at an angle and using an LED (e.g., red or green light) to provide side illumination to reflect light off the etched surface to the viewer's eye. Thus, the reticle can provide contrast at every point, while conveying the necessary target information in a range of daytime conditions.

Figure 17:
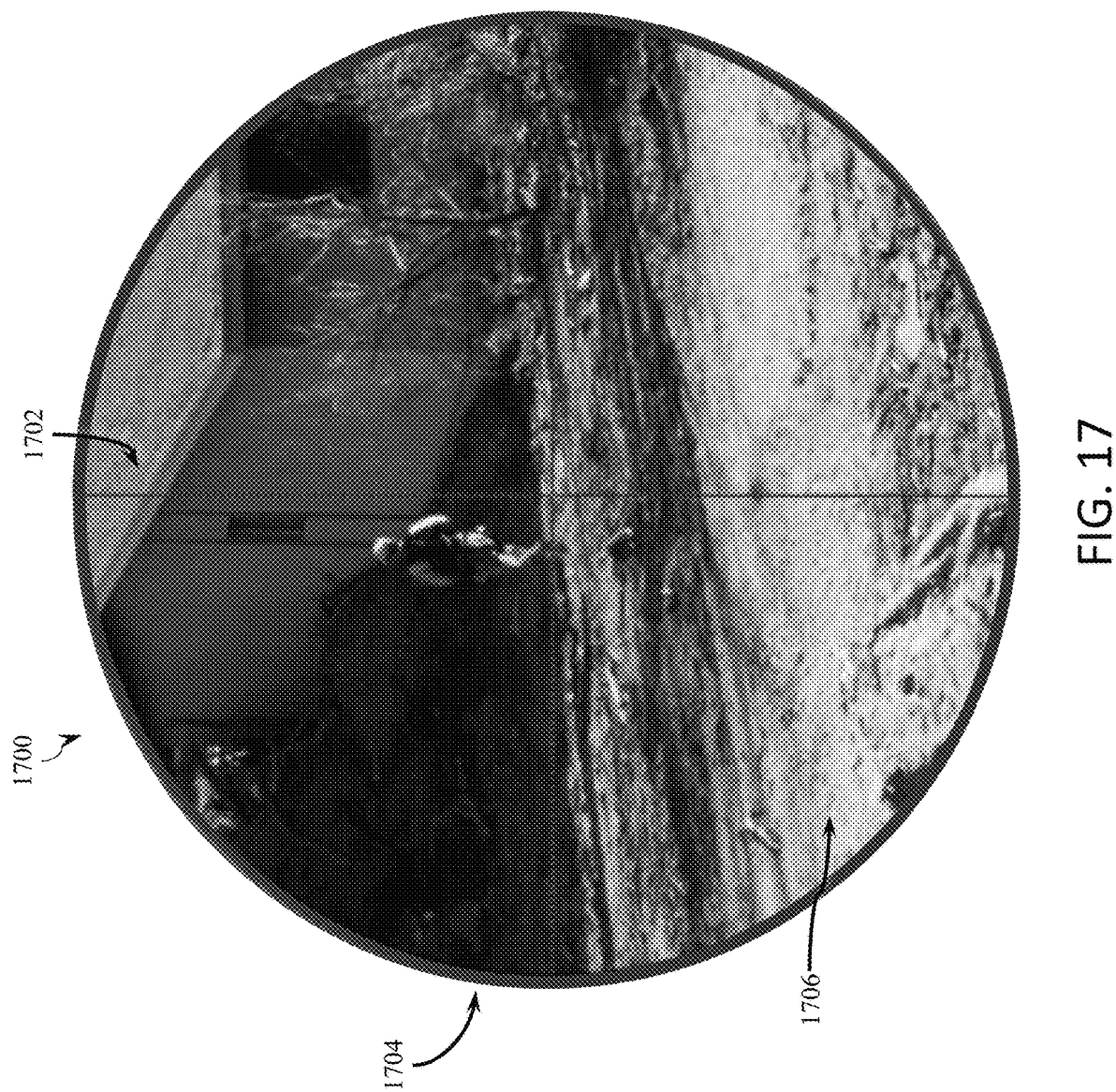
FIG. 17 shows an illustrative scope image with an example of a highly visible reticle, in accordance with an embodiment.

Referring to FIG. 17, a reticle illustrates an example field of view of a day scope 1700, in accordance with an embodiment. A reticle 1702 includes opaque and illuminated elements comprising a high contrast pattern that is discernible to the human eye both within the reticle and between the reticle and the target background. In one embodiment, the opaque elements are black and the illuminated elements are red or green. It will be appreciated that the reticle illustrated in FIG. 17 is not to scale and is provided for illustrative purposes only. In many practical implementations, a reticle comprising smaller elements and higher frequency patterns than illustrated herein may be used. The reticle lines are in constant contrast with every background and are always visible. This allows the reticle to be visible in darker areas 1704 and brighter areas 1706 of the target background. The reticle of the present disclosure facilitates scanning and tracking moving targets while reducing manual illumination changes of conventional systems.

Figure 18:
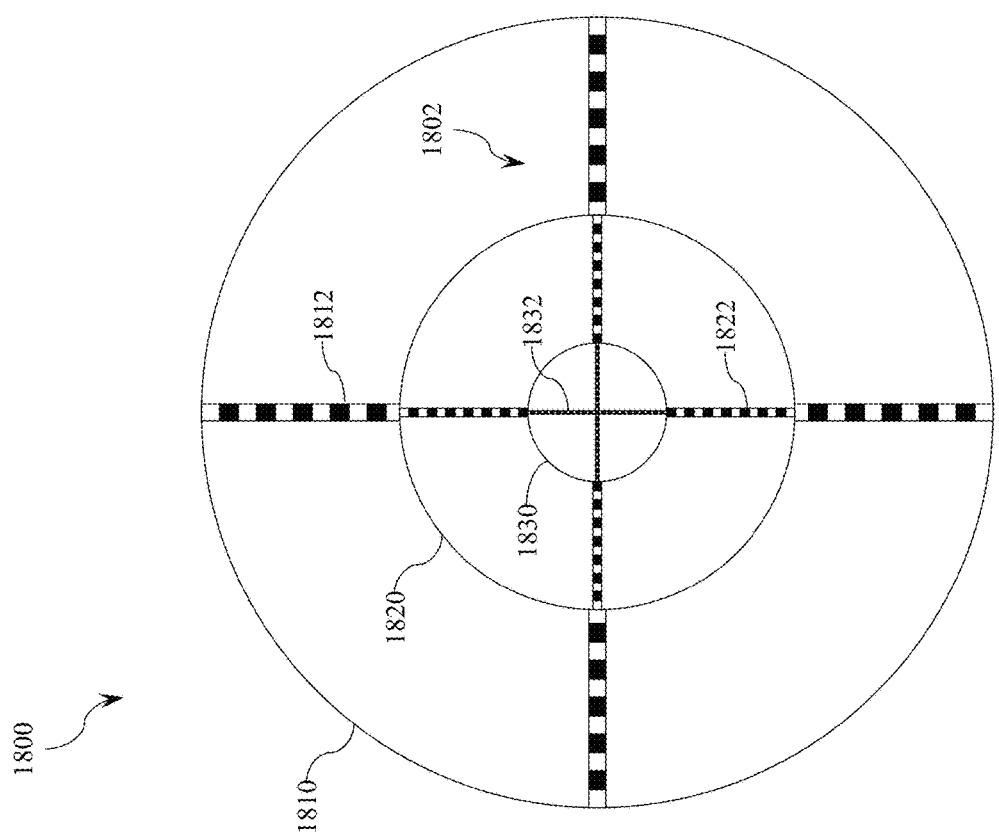
FIG. 18 shows a reticle design for use with a device having variable magnification, in accordance with an embodiment.

Referring to FIG. 18, an embodiment of a reticle for use with a device having variable magnification will now be described. If an optical scope is configured with a reticle having contrasting elements of a fixed size (e.g., an etched reticle as described herein), then the reticle elements may be enlarged as the optical scope zooms in (e.g., causing an obstruction of the view), and reduced as the optical scope zooms out (e.g., blending into portions of the background as the contrasting elements become smaller than a visually resolvable size). To address these issues, an optical scope 1800 is configured with a plurality of magnification levels, such as a low magnification level 1810, which provides a wide field of view, an intermediate magnification level 1820, and a high magnification level 1830. A high visibility reticle 1802, is constructed of contrasting visual elements having a plurality of sizes, each size corresponding to a magnification level. The contrasting visual elements 1812 are constructed in accordance with a visual acuity factor associated with the low magnification level 1810. Contrasting visual elements 1822 are smaller than contrasting visual elements 1812 and constructed in accordance with a visual acuity factor associated with the intermediate magnification level 1820. Contrasting visual elements 1832 are smaller than the contrasting visual elements 1822 and are constructed in accordance with a visual acuity factor associated with the high magnification level 1830. An optical scope may be configured with other numbers of magnification levels and visual element sizes.

When the optical scope 1800 is set to the high magnification level, the contrasting visual elements 1832 form a visible reticle that contrasts against any background without obstructing the view. The larger contrasting visual elements 1822 and 1812 are outside or on the outer perimeter of the field of view and cannot be seen by the user. As the user zooms out, the larger contrasting visual elements 1822 (and then contrasting visual elements 1812) are pulled into the field of view as the reticle 1802 becomes smaller. When the optical scope 1800 is set to a low magnification level, the contrasting visual elements 1812 are sized to provide high contrast against any background, with minimal obstruction of the field of view. In various embodiments, access points or other visual elements may also be added to the reticle.

While the present disclosure describes a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. For example, the direct view optical high visibility technology overlays and electronic display high visibility technology overlays disclosed herein may be used in other embodiments, such as virtual reality, augmented reality and/or assisted reality systems (collectively AR systems). In one embodiment, an AR system may include direct view optical technology (e.g., Microsoft HoloLens) and an illuminated overlay for displaying information. The illuminated overlay may be constructed using contrasting visual elements (e.g., illuminated and block display overlays) that may be sized in accordance with a visual acuity factor to reduce the size of the overlay and obstruction of the field of view. In another embodiment, an AR system includes an electronic display (e.g., an Oculus headset) that uses an illuminated overlay as described herein.

Additionally, while various embodiments of the of the present disclosure have been described, it is to be understood that aspects may include only some of the described embodiments. Accordingly, the present disclosure is not to be seen as limited by the foregoing description, but is only limited by the scope of the following claims.

What is claimed is:

1. An apparatus comprising:
an optical assembly configured to receive a target image of a scene; and
a reticle visible through the optical assembly, the reticle comprising a pattern of contrasting visual elements including opaque elements and illuminated elements, the pattern of contrasting visual elements dynamically adjusted by the apparatus based on a visual acuity factor for a user of the apparatus to improve a visual clarity of the reticle for the user; and
wherein the opaque elements visibly contrast with light portions of the target image, and wherein the illuminated elements visibly contrast with dark portions of the target image.

2. The apparatus of claim 1, wherein the contrasting visual elements include a plurality of illuminate white blocks and a plurality of opaque black blocks; and
wherein each block has the minimum pixel width to satisfy a visual acuity factor for a user of the apparatus based on an approximation of a minimum size of a visual element that is resolvable by the user.

3. The apparatus of claim 1, further comprising:
an imaging component configured to capture the target image;
a processor configured to construct the pattern of contrasting visual elements in accordance with the visual acuity factor for the user of the apparatus based on an approximation of a minimum size of a visual element that is resolvable by the user such that a contrast between the contrasting visual elements is resolvable to the user, generate an electronic reticle constructed of the pattern of contrasting visual elements, and dynamically adjust the pattern of contrasting visual elements based on a change of the visual acuity factor.

4. The apparatus of claim 3, further comprising a display component configured to display the electronic reticle in combination with the image of the target scene, the electronic reticle being displayed as an overlay on the image of the target scene.

5. The apparatus of claim 4, wherein the processor is further configured to determine the pattern of contrasting visual elements for use in constructing the electronic reticle, including alternating illuminated and opaque blocks along the electronic reticle.

6. The apparatus of claim 5, wherein the processor is further configured to construct the pattern of contrasting visual elements using display configuration information and field of view information; and
wherein the display configuration information includes a display resolution comprising a number of horizontal pixels and a number of vertical pixels.

7. The apparatus of claim 1, wherein the reticle is formed by etching at least a portion of the pattern into an optical element of the optical assembly, the etching including a first portion having a visibly opaque color, and a second portion including illuminated elements.

8. The apparatus of claim 7, wherein the optical element is configured to provide a plurality of magnification levels;
wherein the reticle comprises a first set of contrasting visual elements sized in accordance with a first visual acuity factor associated with a first magnification level, and a second set of contrasting visual elements sized in accordance with a second visual acuity factor associated with a second magnification level; and
wherein the first set of contrasting visual elements and the second set of contrasting visual elements have different sizes.

9. The apparatus of claim 8, wherein both the first set of contrasting visual elements and the second set of contrasting visual elements are visible in a field of view at the first magnification level, with the second set of contrasting visual elements having a size that is below the first visual acuity factor; and wherein the second set of contrasting visual elements is visible in the field of view at the second magnification level, and wherein the first set of contrasting visual elements is outside and/or substantially outside the field of view.

10. The apparatus of claim 1, wherein the apparatus further comprises a virtual reality, augmented reality and/or assisted reality apparatus.

11. A method comprising:

disposing optical elements within a scope to receive a target image of a scene;

dynamically adjusting, by the scope, a pattern of contrasting visual elements in accordance with a visual acuity factor for a user of the scope; and constructing a visual overlay adapted to be visible in contrast to the target image when viewed through the scope, the visual overlay comprising the pattern of contrasting visual elements including opaque elements and illuminated elements;

wherein the opaque elements visibly contrast with light portions of the target image, and wherein the illuminated elements visibly contrast with dark portions of the target image.

12. The method of claim 11, wherein the contrasting visual elements include a white block and a black block.

13. The method of claim 12, wherein each block has the minimum pixel width and height to satisfy the visual acuity factor.

14. The method of claim 11, wherein constructing the overlay further comprises determining a fill pattern of contrasting visual elements for use in constructing the overlay.

15. The method of claim 14, wherein the fill pattern includes alternating white and black blocks.

16. The method of claim 11 wherein the visual acuity factor is substantially equal to 5 arc-minutes.

17. The method of claim 11 wherein the pattern of contrasting visual elements are defined using display configuration information and field of view information.

18. The method of claim 17 wherein the display configuration information includes a display resolution comprising a number of horizontal pixels and a number of vertical pixels.

19. The method of claim 11 further comprising etching at least a portion of the pattern into an optical element of the scope, the etching including a first portion having a visibly opaque color, and a second portion including illuminated elements.

20. The method of claim 19 further comprising disposing a light emitting diode adjacent to the optical element, the light emitting diode configured to illuminate the illuminated elements during operation.

* * * * *

UNITED STATES PATENT AND TRADEMARK OFFICE
CERTIFICATE OF CORRECTION

PATENT NO. : 11,302,041 B2
APPLICATION NO. : 16/802489
DATED : April 12, 2022
INVENTOR(S) : Hoffman et al.

It is certified that error appears in the above-identified patent and that said Letters Patent is hereby corrected as shown below:

In the Specification

In the Cross-Reference to Related Applications:
Column 1, Lines 7-8, change "patent application Ser. No." to --Patent Application No.--.

Signed and Sealed this
Second Day of August, 2022

Katherine Kelly Vidal
*Director of the United States Patent and Trademark Office*